(12) United States Patent
Kishigami et al.

(10) Patent No.: US 6,351,238 B1
(45) Date of Patent: Feb. 26, 2002

(54) DIRECTION OF ARRIVAL ESTIMATION APPARATUS AND VARIABLE DIRECTIONAL SIGNAL RECEIVING AND TRANSMITTING APPARATUS USING THE SAME

(75) Inventors: Takaaki Kishigami; Takashi Fukagawa, both of Kanagawa; Makoto Hasegawa, Tokyo, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/510,997

(22) Filed: Feb. 22, 2000

(30) Foreign Application Priority Data

Feb. 23, 1999 (JP) .......................................... 11-044392
Jan. 24, 2000 (JP) ....................................... 2000-014515

(51) Int. Cl.$^7$ ................................................ G01S 5/04
(52) U.S. Cl. ...................................... 342/445; 342/417
(58) Field of Search ................................. 342/417, 437, 342/445, 442, 434

(56) References Cited

U.S. PATENT DOCUMENTS

| | | | |
|---|---|---|---|
| 5,815,117 A | | 9/1998 | Kolanek |
| 5,940,029 A | * | 8/1999 | Ninomiya et al. ........... 342/372 |
| 6,064,338 A | * | 5/2000 | Kobayakawa et al. ...... 342/378 |
| 6,084,928 A | * | 7/2000 | Kuwahara ................... 375/347 |

FOREIGN PATENT DOCUMENTS

| | | |
|---|---|---|
| JP | 10-62506 | 3/1998 |

OTHER PUBLICATIONS

Ralph O. Schmidt, "Multiple Emitter Location and Signal Parameter Estimation", *IEEE Transactions on Antennas and Propagation*, vol. AP–34, No. 3, pp. 276–280 (Mar. 1986).

Kautz G.M. et al., "Beamspace DOA Estimation Featuring Mulirate Eigenvector Processing", vol. 44, No. 7, Jul. 1, 1996, pp. 1765–1778, XP000621225.

Fukagawa T. et al., "Adaptive Array Antenna System for Mobile Communications", XP002165718, vol. 44, No. 6, Dec., 1998, pp. 118–123, (Abstract).

Schmidt R.O., "Multiple Emitter Location and Signal Parameter Estimation", vol. AP–34, No. 3, Mar. 1, 1986, pp. 276–280, XP000644956.

European Search Report dated May 14, 2001, application No. EP00103830.

* cited by examiner

*Primary Examiner*—Dao Phan
(74) *Attorney, Agent, or Firm*—Ratner & Prestia, P.C.

(57) ABSTRACT

A direction of arrival (DOA) estimation apparatus of the present invention comprises a plurality of A/D converters that converts a plurality of complex base band signal obtained from the receiving signals of a plurality of antenna elements to respective complex digital signals, a plurality of low pass filters that outputs complex low pass signals with attenuated high frequency components of respective complex digital signals, a plurality of down samplers that outputs complex down sampled and multiplied signals by down sampling the complex low pass signals and multiplying by integral number of sampling intervals of respective A/D converters, and a data transfer section that stores respective complex down sampled signal thus obtained from respective antenna elements temporary and then transfers the data. A variable directional signal receiving and transmitting apparatus of the present invention performs an antenna directivity control based on the output data from the above data transfer section. With the composition of the present invention, an amount of data required for a DOA estimation process section is decreased and a composition of a data transfer section is simplified. With the composition of the present invention, a deterioration of an accuracy of direction estimation becomes minimum despite the simplification of the apparatus. Furthermore, a favorable receiving and transmitting quality is obtained by applying the DOA estimation apparatus for a transmitting and receiving apparatus.

21 Claims, 12 Drawing Sheets

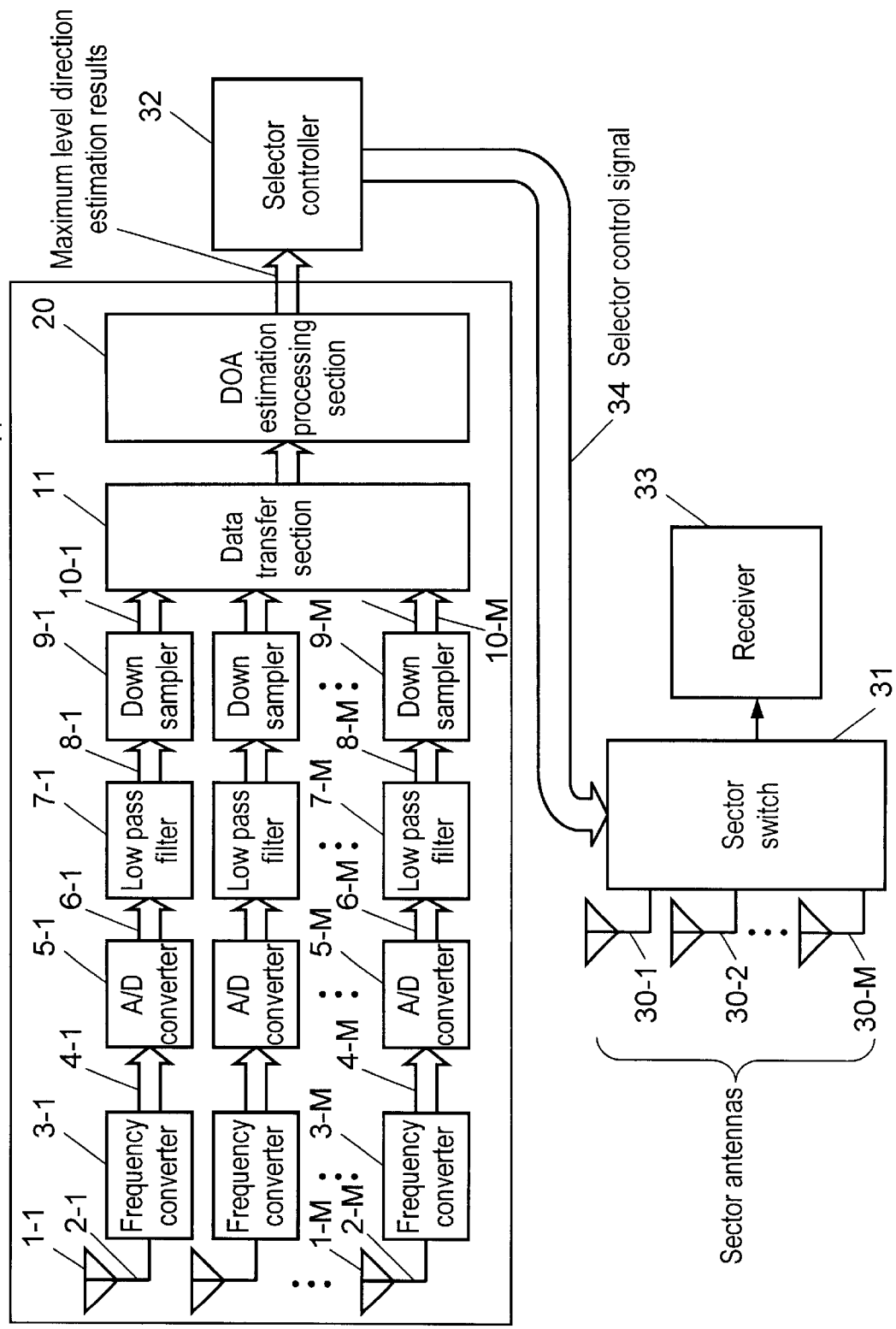

DIRECTION OF ARRIVAL ESTIMATION APPARATUS AND VARIABLE DIRECTIONAL SIGNAL RECEIVING AND TRANSMITTING APPARATUS USING THE SAME

FIELD OF THE INVENTION

The present invention relates to a direction of arrival (herein after recited as DOA) estimation apparatus to estimate a direction of an arrival wave using an array antenna, and a variable directional signal receiving apparatus to vary directional characteristics of an antenna basing on a result of a direction estimation of the DOA estimation apparatus.

BACKGROUND OF THE INVENTION

As one of a method of estimating a direction of an arriving wave with high accuracy using an array antenna composed of plurality of antenna elements, the MUSIC (Multiple Signal Classification) described in a paper "Multiple emitter Location and Signal Parameter Estimation", IEEE Trans., AP-34, 3, pp.276–280 (1986) by R. O. Schmidt has been known. The method is an algorithm that estimates a direction of multiple waves in a same frequency band simultaneously with high accuracy. With reference to FIGS. 15 and 16, the DOA estimation apparatus using the conventional MUSIC method will now be described.

FIG. 15 is a block diagram showing a composition of a DOA estimation apparatus. A signal 102-1 . . . 102-M received by antenna elements 101-1 . . . 101-M, where M is the number of elements (M>1), is converted at frequency converters 103-1 . . . 103-M connected to each antenna elements 101-1 . . . 101-M and the signals are phase detected and then are converted to complex base band signals 104-1 . . . 104-M composed of an orthogonal I, Q signals.

The each complex base band signals 104-1 . . . 104-M are converted from analog signals to complex digital signals 106-1 . . . 106-M by an analog/digital converters (A/D converters) 105-1 . . . 105-M.

A data transfer section 107 transfers data of each complex digital signals x1(k),x2(k), . . . ,xM(k) obtained from the complex digital signals 106-1 . . . 106-M at a sample time of k$\Delta$T ($\Delta$T is a sample interval) to a DOA estimation processing section 108 in a lump at a specified timing after storing specified sample time temporarily.

A DOA processing section 108 performs a computation from the output data of the data transfer section 107 basing on the MUSIC method and estimates a direction.

FIG. 16 is a block diagram of a conventional DOA processing section 108. A computation of covariance matrix means 109 makes a receiving vector X(k) expressed with formula 1 using the complex digital signals 106-1 . . . 106-M obtained from the data transfer section 107 and makes a covariance matrix R shown in formula 2 using the receiving vector X(k) of the sample time k=1 . . . N. The T indicates transposition, and the H exhibits complex conjugate transposition.

$$X(k)=[x_1(k), x_2(k), \ldots, x_M(k)]^T \quad \text{(formula 1)}$$

$$R = \sum_{k=1}^{N} X(k)X(k)^H / N \quad \text{(formula 2)}$$

An eigenvalue computation means 110 gets eigenvalues $\lambda 1 \ldots \lambda M$ by computing the eigenvalues of the covariance matrix R in descending order.

An eigenvector computation means 111 computes eigenvectors $e_1 \ldots ,e_M$ corresponding to the eigenvalues $\lambda 1 \ldots \lambda M$. In a case, a number of arriving waves is S, a DOA evaluation function computation means 112 uses (M . . . S) number of eigenvector matrix $E_N=[e_{s+1}, \ldots ,e_M]$ belonging to a subspace spanned by noise eigenvector (hereinafter noise subspace) relative to formula 3 and utilizes an orthogonal characteristics between a subspace spanned by signal eigenvector (hereinafter signal subspace) $Es=[e_1, \ldots ,e_M]$ spread by eigenvector $e_1, \ldots ,e_M$ and $E_N$. Namely, the DOA estimation function $F(\theta)$ is defined as formula 4, that evaluates an orthogonal characteristics with $E_N$ at the time when$\theta$ is rotated from 0 to 360°, wherein $a(\theta)$ (steering vector) indicates complex response of an array antenna against the direction$\theta$.

$$\lambda_1 \geq \lambda_2 \geq \cdots \geq \lambda_S > \lambda_S+1 = \lambda_S+2 = \cdots = \lambda_M \quad \text{(Formula 3)}$$

$$F(\theta)=\{a^H(\theta)E_N E_N^H a(\theta)\}^{-1} \quad \text{(formula 4)}$$

In a case when $\theta$ equals to an arriving angle, the DOA estimation function $F(\theta)$ idealistically becomes infinite value. Therefore, the direction of peak value from the result of the computation of $F(\theta)$ at the time of angle $\theta$ is regarded as the DOA estimation of an arriving wave.

In general, since the number of arriving waves S is unknown, a judgement is made to determine the number of waves by distribution of eigenvalue or by setting a signal number judgement reference described in the paper M. Wax and T. Kailath, "Detection of Signals by Information Theoretic Criteria", IEEE Trans. On Acoustics, Speech and Signal Processing, Vol. ASSP33(2), pp.387–392, February (1985).

With such DOA estimation apparatus using above MUSIC method, that estimates the DOA accurately by signal processing using an algorithm of eigenvalue decomposition, an reciprocally correlative value of the receiving signals between the antenna elements is obtained with the covariance matrix. And, statistically, the accuracy becomes higher when the observation time is longer. As a result, the higher accuracy of the DOA estimation is obtained. In order to secure certain accuracy level of the DOA estimation, it has been a problem that an amount of memory storing the temporary data at the data transfer section becomes larger, since the amount of receiving data used for the DOA estimation becomes larger due to handling a large amount of receiving signal data from each antenna elements converted to digital signals by A/D converters.

And also, it is required to secure transferring speed at a data transfer section and computation ability of signal processing apparatus corresponding to the moving speed of the estimating object when estimating the DOA of an transmitter loaded on a moving object.

With such DOA estimation apparatus using MUSIC method, that estimates the DOA accurately by signal processing using an algorithm eigenvalue decomposition of array receiving signals of a covariance matrix, it has been a problem that arriving waves cannot be separated with high accuracy when reciprocal delay time between the multiple waves reflected from the earth or buildings is shorter than a symbol length since the rank of the covariance matrix is decreased due to the high correlation between the multiple waves.

In order to deal with this problem, the Spatial Smoothing method has been proposed in the paper of Pillai et al, "Forward/Backward Spatial Smoothing Techniques for Coherent Signal Identification", IEEE Trans. On Acoustics, speech and signal processing, VOL.37, NO.1, 1989.

With the spatial smoothing method, however, it has been a problem that substantial effects can not be obtained since the freedom of array is decreased further than sub-arrayed in a case of a four-element circular array antenna or so due to taking the averaging processing of a covariance matrix from sub-arrayed linear array.

The purpose of the present invention is to simplify the composition of the DOA estimation apparatus, and to provide an apparatus that enables to decrease the transfer speed of a data transfer section to signal processing apparatus and at the same time to decrease the memory capacity for accumulation and to alleviate the computation capacity of signal processing apparatus by decreasing the amount of computation.

And also, in a case when application is not to estimate directions of all the multiple arriving waves but limited to estimate the direction of the maximum level among the multiple arriving waves, the present invention is to provide an DOA estimation apparatus to detect accurately an DOA of the maximum level among multiple waves, even when the number of antenna elements is small and the correlation between the arriving waves is high.

Furthermore, utilizing a result of estimation by a DOA estimation apparatus, the present invention is to provide a variable directional signal receiving apparatus that improves receiving quality by controlling directivity of an antenna.

The another purpose of the present invention is to provide the DOA estimation apparatus that can estimate a direction of a main wave accurately even with a simple array composition like four elements or so and under multiple wave environment where correlation waves exist.

Still another purpose of the present invention is to provide a variable directional signal receiving apparatus, a variable directional signal transmitting apparatus and a variable directional signal receiving and transmitting apparatus that improves receiving and transmitting quality by controlling directivity of an antenna, utilizing a result of estimation by the DOA estimation apparatus.

SUMMARY OF THE INVENTION

In order to deal with the aforesaid problems, the DOA estimation apparatus of the present invention comprises:
- a plurality of A/D converters that converts a plurality of complex base band signals obtained from the receiving signals of plurality of antenna elements to each complex digital signals,
- a plurality of low pass filter that output complex low pass signals with attenuated high frequency components of each complex digital signal,
- a plurality of down samplers that output complex down sampled signal by down sampling the complex low pass signals multiplied by integral number of sampling interval of each A/D converters.
- a data transfer section that accumulates each complex down sampled signals thus obtained from each antenna elements temporarily and then transfers the data.

The variable directional signal receiving apparatus of the present invention improves the receiving quality of receiving apparatus by controlling directivity of antenna based on the aforesaid output data from the data transfer section.

The composition of the DOA estimation apparatus of the present invention comprises:
- an arrival wave number judgement section that judges the number of arriving wave taking into consideration the correlation among them,
- a DOA estimation section that performs computation for the DOA estimation based on the conventional eigenvalue decomposition method such as MUSIC method using the number of arriving waves from the judgement section,
- an arrival wave power estimation section that estimates the power of arriving wave,
- a main wave direction estimation section that estimates the direction of maximum level of arriving wave by synthesizing the estimation results of the DOA estimation section and of arrival wave power estimation section.

Thus, the deterioration of the accuracy of the DOA estimation can be suppressed at minimum level by combining the power estimation even when there is a highly correlated wave among the arrival waves.

BRIEF DISCRIPTION OF THE DRAWINGS

FIG. 6 is a block diagram of a variable directional signal receiving apparatus in accordance with a third exemplary embodiment.

DESCRIPTION OF THE PREFERRED EMBODIMENT

With reference to FIG. 1 to FIG. 6, an exemplary embodiment of the present invention will now be described.

The First Exemplary Embodiment.

Figure 1:
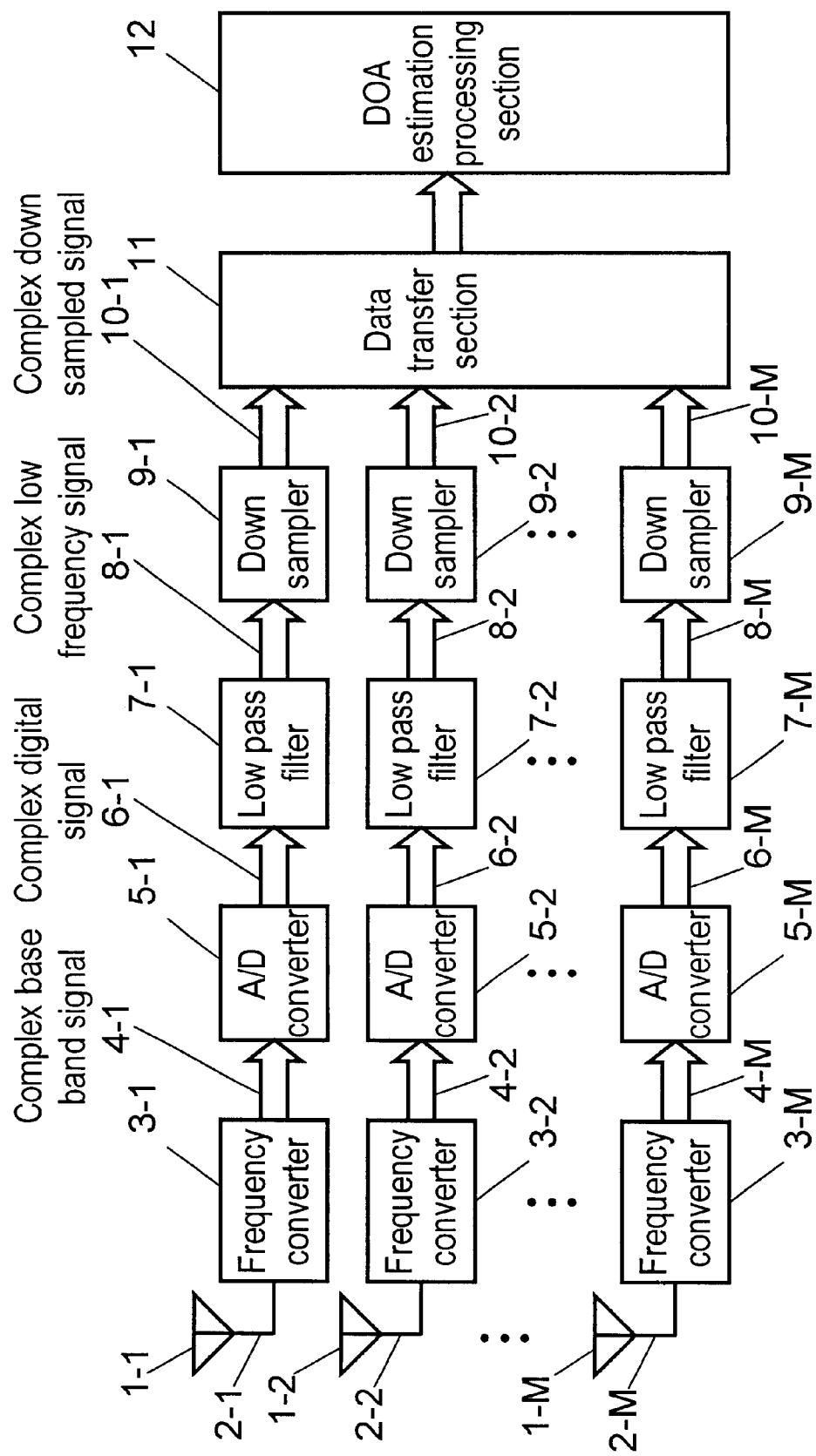
FIG. 1 is a block diagram showing the composition of a DOA estimation apparatus in accordance with an first exemplary embodiment.

FIG. 1 is a block diagram of a DOA estimation apparatus of the present invention. The signals 2-1 . . . 2-M received by antenna elements 1-1 . . . 1-M, where M is a number of elements (M>1), are converted at frequency converters 3-1 . . . 3-M connected to each antenna elements 1-1 . . . 1-M and the signals are phase detected and then are converted to complex base band signals 4-1 . . . 4-M composed of orthogonal I, Q signals. The respective complex base band signals are converted from analog signals to complex digital signals 6-1 . . . 6-M by A/D converters 5-1 . . . 5-M. The sampling frequency fs of the AID converter 5-1 . . . 5-M here is to satisfy the sampling theorem, that is to have the relation against the band width of transmitting modulation wave WB(Hz) as fs≧2WB.

Low pass filters 7-1 . . . 7-M attenuates a high frequency component of 6-1 . . . 6-M and outputs complex low band signals 8-1 . . . 8-M smoothed time-wise.

Down samplers 9-1 . . . 9-M performs down sampling at every Nd samples with a complex low band signal 8-1 . . . 8-M that is sampled with a sampling interval of ΔT(=1fs) and converted to low band signals and then outputs complex down sampled signals 10-1 . . . 10-M.

The data transfer section 11 transfers $x_1(k)$, $x_2(k)$, . . . ,$x_M(k)$ obtained from the complex down sampled signals 10-1 . . . 10-M. to a direction estimation processing section 12. The (k) here indicates down sample time k×Nd×ΔT.

Figure 15:
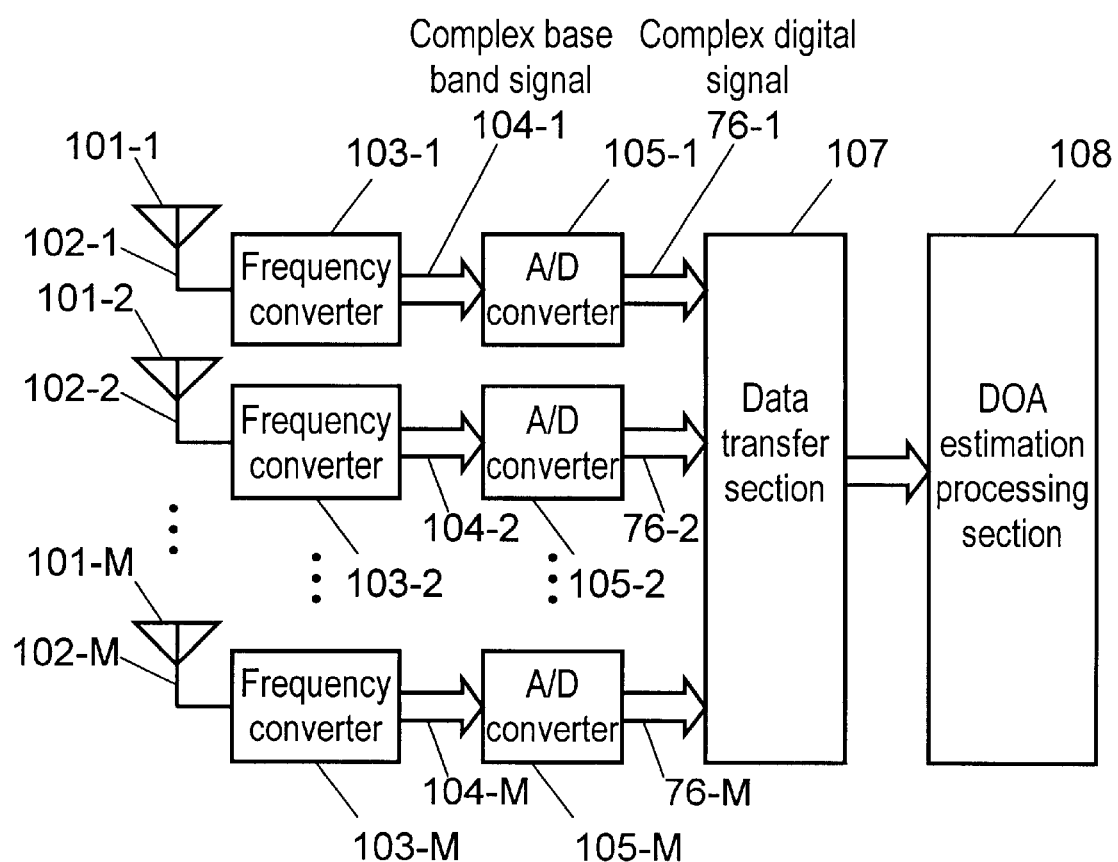
FIG. 15 is a block diagram of a conventional DOA estimation apparatus.
Figure 16:
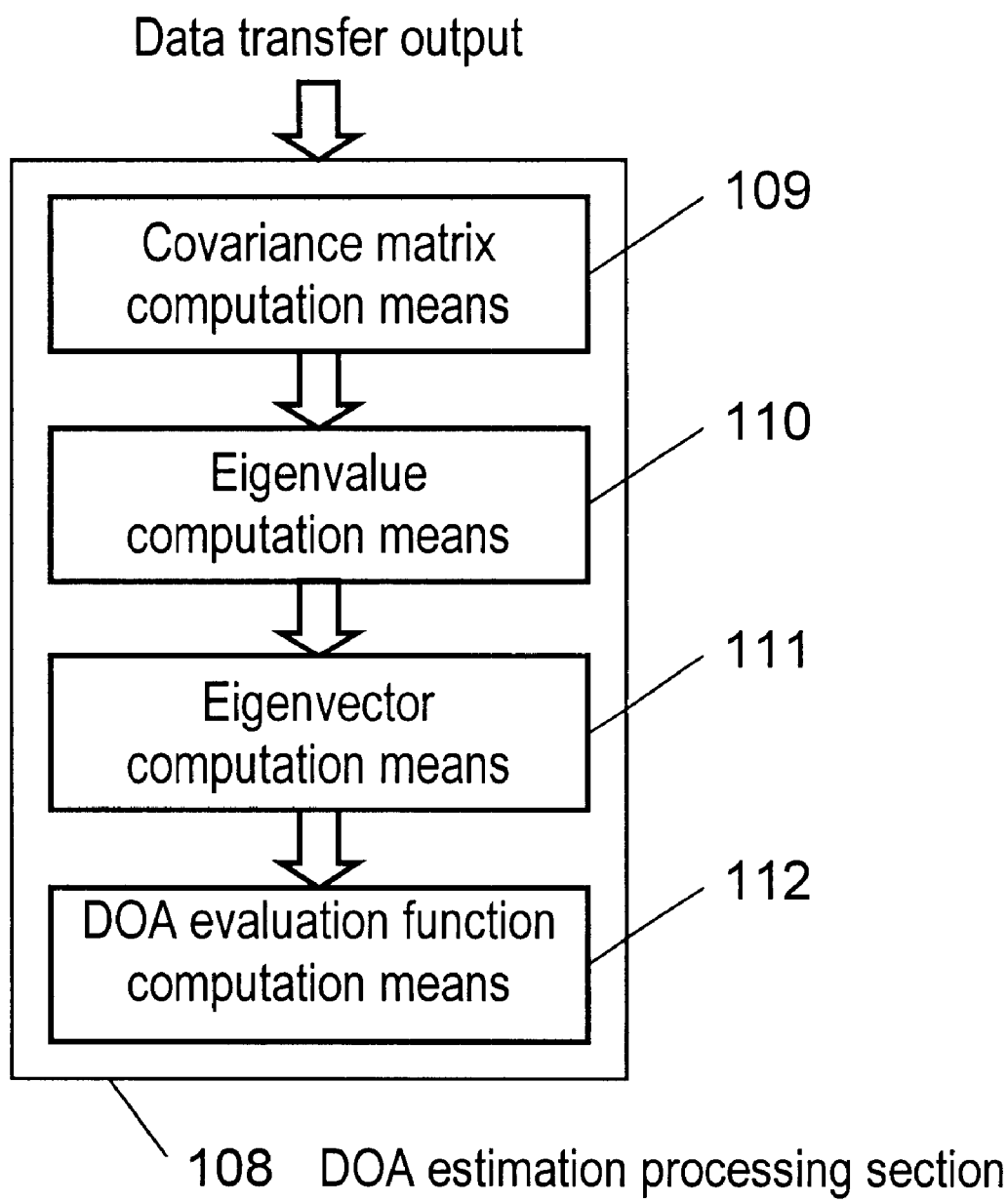
FIG. 16 is a block diagram of a conventional direction estimation process section.

The direction estimation processing section 12 performs direction estimation using the output data from the data transfer section 11 by performing computation based on the MUSIC method. The contents of the direction estimation processing section 12 has the same composition with the direction estimation process section 108 in FIG. 15 and performs the same processing.

With the aforementioned composition of the present invention, it is different from the conventional apparatus in outputting a complex low band signals 8-1 . . . 8-M attenuated a high frequency component of the complex digital signal with the low pass filter 7-1 . . . 7-M and smoothed time-wise. Another difference with the conventional apparatus is to make down sampling of the complex digital signal at every Nd samples in the down samplers 9-1 . . . 9-M. Namely, since the complex down sampled signals 9-1 . . . 9-M become N/Nd against the sample number N of the complex digital signal 6-1 . . . 6-M, the computation of the covariance matrix computation means 109 at the direction estimation processing section 108 is shown as formula 5, while it is shown conventionally as formula 2.

$$R = \sum_{k=1}^{N/Nd} X(k)X(k)^H / N \quad \text{(formula 5)}$$

Even though the computation amount is decreased, since the number of data is decreased due to the down sampling, adversely the accuracy in the reciprocal correlation value of the receiving signal 2-1 . . . 2-M from each antenna elements declines. However, since the output of A/D converter 5 is smoothed by a low pass filter 7, the accuracy deterioration can be suppressed at the minimum.

Figure 2:
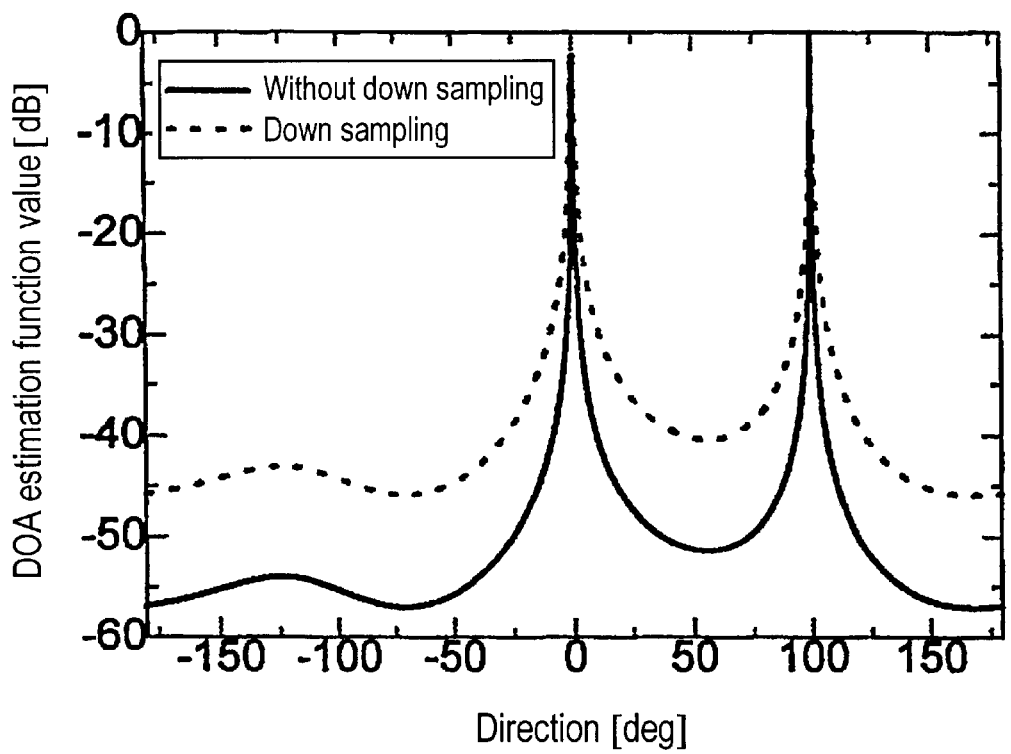
FIG. 2 shows a comparison between a result of a simulation by direction estimation process section in accordance with the first exemplary embodiment and a result by the MUSIC method.

FIG. 2 is a chart comparing a processing result of the direction estimation process section 12 with a result of the conventional MUSIC method by a computer simulation.

FIG. 2 shows an estimation result in the case that two waves arrive from the direction of 0° and 100° to a four-elements circular array antenna. The result is respectively normalized by the maximum value. With the present exemplary embodiment, the data amount of the complex digital signal 6-1 . . . 6-M is suppressed 1/100 by down sampler section 9. Even though the peak value of the DOA evaluate function value is decreased by the down sampling, the direction of the peak matches within the aberration 1 degree, and it can be confirmed that the accuracy is not much deteriorated.

Figure 3:
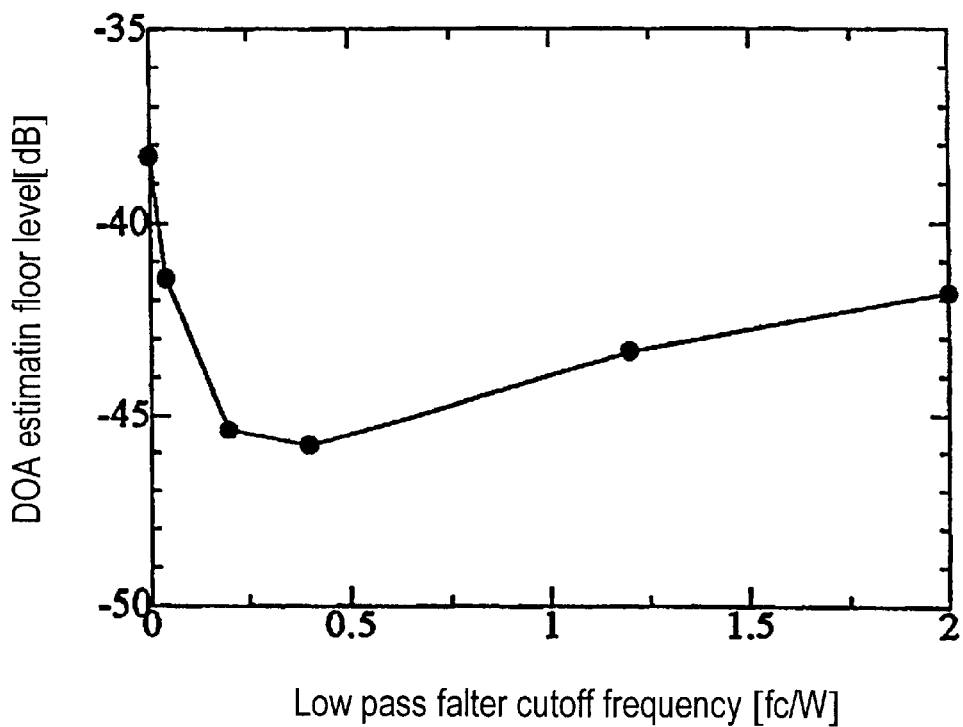
FIG. 3 shows a relation between a low pass filter cut off frequency and a DOA estimation level in accordance with the first exemplary embodiment.

FIG. 3 shows a relation between a cut off frequency f (=fc/W) of a low pass filter 7 normalized at transfer 3 dB band width W and a DOA estimation floor level when the data amount of the complex digital signal 6-1 . . . 6-M is suppressed 1/100 by the down sampler section 9. The fc is a carrier frequency of a wave of which DOA is to be estimated. The effect of improvement can be obtained by optimizing the cut off frequency f of the low pass filter 7 within the 10–50% of 3 dB band width W.

Thus, with the present exemplary embodiment, the deterioration of the direction estimation accuracy can be suppressed at the minimum level and the amount of data processed at the estimation processing section can be decreased by down sampling the complex digital signal 6 at the down sampler section 9 after passing through the low pass filter 7. As a result, by enabling the decrease of the required amount of memory for accumulation and of the data transfer speed, the cost of the data transfer section 11 can be lowered. By the same reason, the amount of computation in the covariance matrix means 109 at the direction estimation processing section 12 can be decreased. Thus the required computation processing capability can be decreased and the cost of the direction estimation processing section 12 can be lowered.

Figure 4:
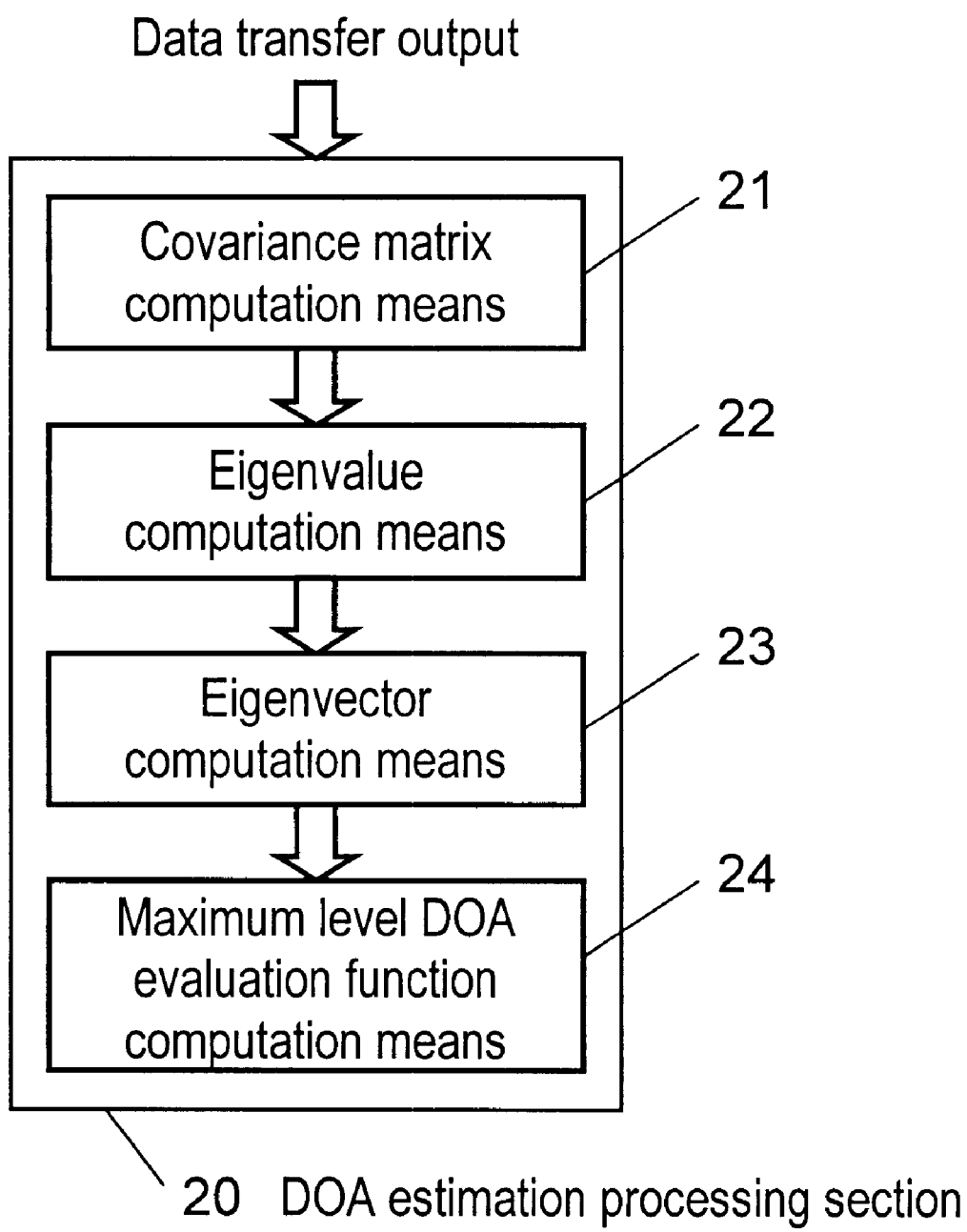
FIG. 4 is a block diagram of a direction estimation processing section in accordance with an second exemplary embodiment.

With the above description, although an example to perform the direction estimation by the MUSIC method at direction estimation process section 12, the same is applicable to the direction estimation algorithm based on the other eigenvalue decomposition of a eigenvalue matrix The Second Exemplary Embodiment With the present exemplary embodiment, the direction estimation processing section 20 of the block diagram in FIG. 4 is used, in place of the direction estimation processing section 12 in FIG. 1. The description of the output of the data transfer section 11 is omitted here, since the description is the same as in the first exemplary embodiment described in FIG. 1. The operation of direction estimation process section 20 will now be described.

A covariance matrix computation means 21 computes a covariance matrix R using the receiving vector from X(1) to X(Ns) storing Ns numbers of complex down sampled signals 10 down sampled at the down samplers 9. Herein, the k=1 . . . N, T indicates transposition, and the H indicates complex conjugate transposition.

$$R = \sum_{k=1}^{Ns} X(k)X(k)^H / N \quad \text{(formula 7)}$$

A eigenvalue computation means 22 computes an eigenvalue λ1–λM by computing the eigenvalue of the covariance matrix R in descending order. An eigenvector computation means 43 computes an eigenvector $e_1$–$e_M$ corresponding to the eigenvalue λ1–λM. A maximum level DOA evaluate function computation means 24 estimates a arriving direction of a wave with the maximum level using a vector space matrix Es=[$e_2$, . . . ,$e_M$] shown with a (M−1) number of eigenvector except a maximum eigenvalue and the DOA evaluate function $F(\theta)$ shown by formula 4. It corresponds to that all eigenvector other than an eigenvector corresponding to the maximum eigenvalue is regarded to show a noise subspace. A direction of an arrival wave is estimated by performing a peak search based on a result of the DOA evaluate function $F(\theta)$ at the time when an angle $\theta$ is rotated from 0° to 360°.

Figure 5A:
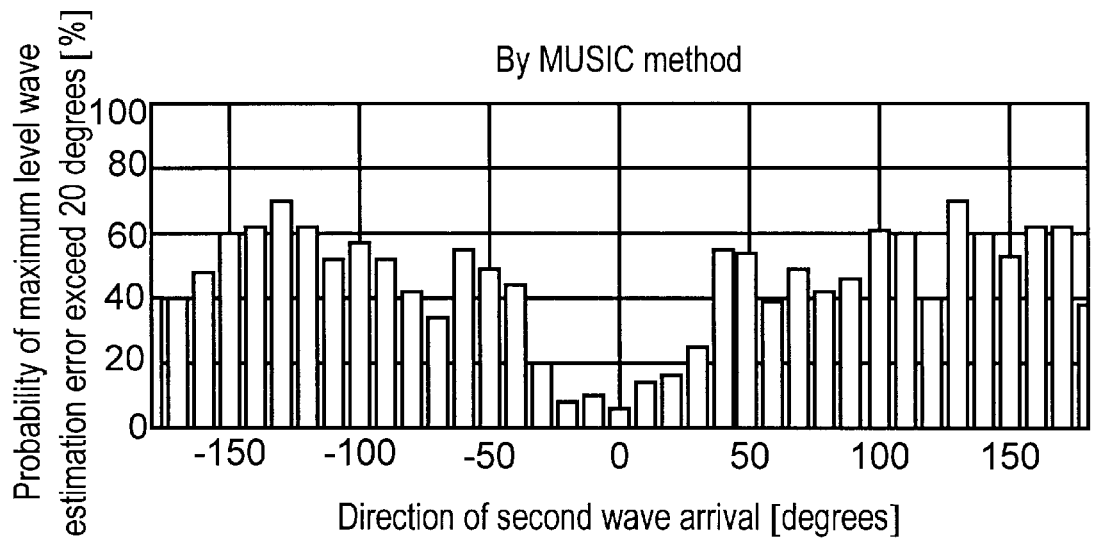
FIG. 5A shows a simulation result of a operation by direction estimation process section in accordance with the second exemplary embodiment.
Figure 5B:
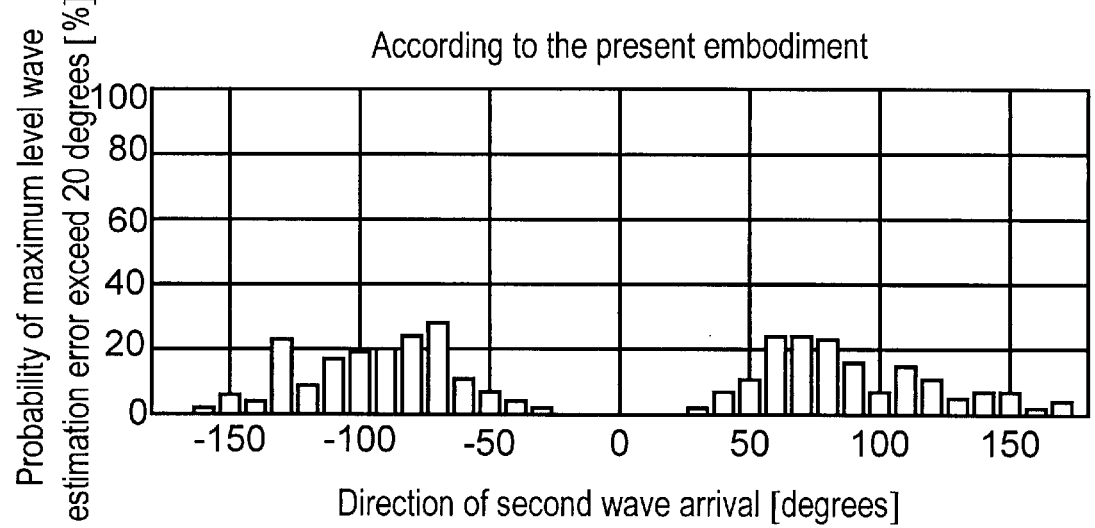
FIG. 5B shows a simulation result of a operation by the MUSIC method.

FIGS. 5A, B show results of the DOA estimation simulation conducted with a four elements circular array antenna by the MUSIC method (FIG. 5A) and the present exemplary embodiment (FIG. 5B) respectively. The condition for the simulation is as follows.

A case is supposed that two waves of which reciprocal correlation value of 0.7 at S/N=10 dB arrive, and the cut off frequency of the low pass filter 7 is 100 kHz against a QPSK modulation of 6 MHz band width. The arriving angle of the first wave is 0° with the signal level is 0 dB and signal level of the second wave is −3 dB and the arriving angle is to be rotated from −180 degrees to 180 degrees with 10 degrees interval. The sampling frequency fs of the A/D converter 5 is 4 times of the symbol frequency $f_{symbol}$, and down sampling is fs/100.

As it is clearly shown in FIG. 5, a probability of estimation error of the maximum level wave exceed more than 20 degrees is smaller with the present exemplary embodiment than that of the MUSIC method, and the improvement in estimation accuracy is observed.

With the present exemplary embodiment, in addition to the effect explained in the first exemplary embodiment, the direction of the arrival wave with the maximum level among the plurality of arriving waves can be estimated accurately by having the maximum level DOA evaluate function computation means 24 in the direction estimation processing section 20.

Namely, with the present exemplary embodiment, the direction of the arrival wave with the maximum level among the plurality of arriving waves can be estimated accurately even in the case when the number of elements of antenna are small and the correlation between the arrival waves is high, by limiting the application of estimation not for all the plurality of arrival waves but for the maximum level arrival wave among the plurality of arrival waves.

The Third Exemplary Embodiment

Based on the estimation result in the second exemplary embodiment 2, a variable directional signal receiving apparatus of which directivity is variable by selecting the plurality of sector antenna will now be described. The variable directional signal receiving apparatus of the present exemplary embodiment is effective for improving the receiving quality.

FIG. 6 is a block diagram of a variable directional signal receiving apparatus. The variable directional signal receiving apparatus comprises a DOA estimation apparatus having a function of direction estimation processing section shown in the second exemplary embodiment, m pieces (m≧2) of sector antennas 30-1 . . . 30-m having different main beam directions, a sector switch 31, a sector controller 32 and a receiver 3.

With reference to FIG. 6, the operation taken place here will now be described. The detailed description of an estimation operation using the signals 2-1, . . . 2-M obtained from the plurality of antenna elements 1-1 . . . 1-M are omitted since the description is the same with that of the first exemplary embodiment and in the second exemplary embodiment 4. The final result of the maximum level direction estimation at the DOA estimation processing section 20 is input to the sector controller 32.

The sector controller 32 selects the number ms sector antenna of which main bean direction is the closest direction of the maximum level wave among the plurality of sector antennas from 30-1 to 30-M based on the estimation result, and controls the sector switch 31 to be connected to the receiver 33.

The sector switch 31 connects the number ms sector antenna to the receiver 33 based on the sector control signal 34. The receiver 33 performs demodulation operation to the receiving signal from the connected number ms sector antenna.

By the above operations, the most appropriate sector antenna of which main bean direction is the closest direction of the maximum level wave can be selected among the plurality of sector antennas 30-1, . . . ,30-M and the receiving signal with high S/N ratio can be obtained. Also, the multiple beams other than the main beam direction of the selected sector antenna is suppressed and the interference between the signals can be decreased.

With the present exemplary embodiment, the description is made that the sector antenna is selected in matching to the maximum level direction estimation result at the DOA estimation process section 20. Other than this, the same effect can be achieved with the composition that the main beam direction is to be matched with the maximum level direction estimation result at the DOA estimation process section 20 by performing the phase control of the plurality of antenna elements 1-1, . . . ,1-M with the phase control signal from the sector control section 32 by installing a phase control section, which is not shown in FIG. 6, in place of the sector switch 31.

Thus, with the first exemplary embodiment through third exemplary embodiment, the deterioration of the direction estimation accuracy can be suppressed to the minimum level, the amount of data processed at the estimation processing section can be decreased by the down sampling the complex digital signals after passing through the low pass filter, required amount of memory for accumulation can be decreased and also the data transfer speed can be decreased.

As the result, a favorable effect of lowering the cost of the DOA estimation processing section can be achieved by decreasing the amount of computation with the covariance matrix computation means in the DOA estimation processing section and by decreasing the required computing processing capability.

Furthermore, the direction of the arrival wave with the maximum level among the plurality of arrival waves can be estimated accurately even in the case when the numbers of the antenna elements is small and the correlation between the arrival waves is high, by limiting the application of estimation not for all the arrival waves but for the maximum level arrival wave among the plurality of arrival waves.

The Fourth Exemplary Embodiment

Figure 7:
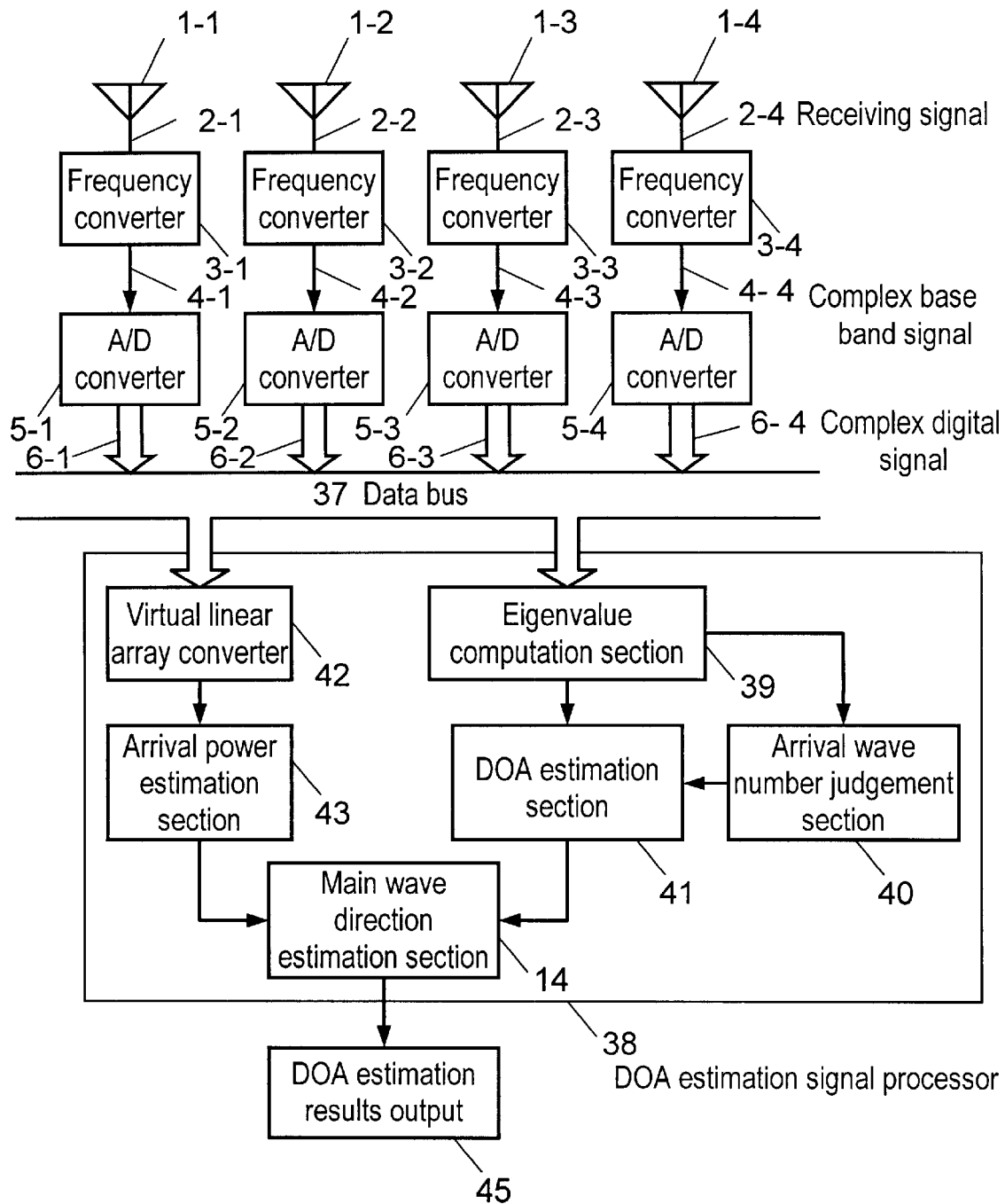
FIG. 7 is a block diagram of the DOA estimation apparatus in accordance with a fourth exemplary embodiment.

FIG. 7 is a block diagram of the DOA estimation apparatus of the present invention. For the direction estimation section 38 of FIG. 7, the direction estimation section 12 of FIG. 1 is applicable. With reference to FIG. 7, the operation will now be described.

The antennas 1-1, . . . ,1-M, where M is the number of elements (M>1), are placed in a circular shape array having the elements in the identical intervals with radius r. With reference to FIG. 7, a four elements array, making M=4, is shown as an example.

The receiving signals 2-1, . . . ,2-M received by the respective antenna elements 1-1, . . . ,1-4 (1-M in general, hereinafter shown as a general example) are frequency converted at the frequency converters 3-1, . . . ,3-M connected to respective antenna elements 1-1,...,1-4 and, after being through the quadrature demodulation, converted to the complex base band signals 4-1, ...,4-M composed of orthogonal I, Q signals. Respective complex base band signals 4-1, ...,4-M are converted from analog signals to complex digital signals 6-1,...,6-M by A/D converters 5-1, ...,5-M. The sampling frequency fs of the A/D converters 5-1, ...,5-M here is not required to be sampled with a nyquist condition as fs≧2WB against the band width of transmitting modulation wave $W_B$(Hz) since modulation operation is not taken place in the following processing, but the jitter of sampling is required to be small enough so that sufficient accuracy of the DOA estimation can be obtained.

Through the data bus 37, the A/D converters 5-1,...,5-M transfer the data $x_1(k), x_2(k), \ldots, x_M(k)(k=0, \ldots, Nd)$ composed of complex digital signals 6-1,...,6-M from time t0 to time t0+NdΔT at an every interval time of specified sample number Nd to the DOA estimation signal processing section 38. Herein the ΔT indicates a sampling interval.

The operation in the DOA estimation signal processing section 38 will now be described. First, the eigenvalue computation section 39 makes a receiving vector X(k) shown by formula 5 using the complex digital signals 6-1 . . . 6-M obtaining from the data bus 37, and computes a covariance matrix R shown by formula 6 using the receiving vector X(k) of the sample time k=1 Nd. Herein the T exhibits transposition, the H exhibits complex conjugate transposition.

$$X(k)=[x_1(k), x_2(k), \ldots, x_M(k)]^T \quad \text{(formula 5)}$$

$$R = \Sigma X(k)X(k)^H/N \quad \text{(formula 6)}$$
(k=1 to Nd)

Next, the eigenvalue computation section 39 makes the eigenvalue λA, ... ,λM by computing the eigenvalue of the covariance matrix R in descending order and then computes the eigenvector $e_1, \ldots, e_M$ corresponding to the eigenvalue λ1, ... ,λM.

The arrival wave number judgement section 40 computes a ratio Er=(the maximum eigenvalue/the next largest value) that is the ratio between the maximum eigenvalue and the next largest eigenvalue of the covariance matrix R and compares with the specified value Dr. The numbers of arriving waves, in the case of Er≧Dr, is judged as 1 regarding the number of arrival wave is one or plural, and in the case of Er<Dr, the numbers of arrival waves is judged as M-1.

In the case that the actual number of arrival waves is less than M-1, even though a false peak tends to be generated in the arrival direction estimation result by formula 7 in the DOA estimation section 41 due to the margin of array in certain degree, the false peak can be eliminated by synthesizing with a power estimation result at the arrival wave power estimation section 43.

In a case the judgement of number of arriving waves obtained from the arrival wave number judgement section 40 is S, the DOA estimation section 41 regards the matrix $EN=[e_{s+1}, \ldots, e_M]$ composed of (M-S) numbers of eigenvector $e_{s+1}, \ldots, e_M$ as a noise subspace and regards the matrix $E_s=[e_1, \ldots, e_S]$ composed of S numbers of eigenvector $e_1, \ldots, e_S$ as a signal subspace.

The DOA evaluation function F(θ) is defined as formula 7, that evaluates an orthogonal characteristics between a signal subspace Es and a noise subspace En.

Wherein a(θ) is a steering vector which is a complex response of array antenna against direction θ and outputs the result of computation of F(θ) at the time when angle θ is varied from 0 to 360 degrees with the specified angle interval Δθ.

$$F(\theta)=[a^H(\theta)E_N E_N a(\theta)]^{-1} \quad \text{(formula 7)}$$

A virtual linear array converter 42 converts signals 2-1, . . . ,2-M received by a circular array to received signals by a virtual linear array. The conversion method to a virtual linear array is described in the paper of M. Wax et al, "Direction Finding of Coherent Signals via Spatial Smoothing for Uniform Circular Arrays", IEEE Trans. AP-42, No.5, 1994. The detailed explanation of the paper is omitted here.

The conversion method will now be described next. The numbers of the elements Mv(=2h+1) in virtual linear array is set as an odd number which satisfies Mv≦M against circular array having M elements. Here h indicates natural number. In this case, a conversion matrix to a virtual linear array is expressed with a matrix product JF of matrix F of formula 8 and matrix J of formula 9. Herein, Jn indicates vessel function of n order, and k=2π/λ, λ indicates a wave length of carrier wave, r indicates the radius of uniform circular array.

$$F = \frac{1}{\sqrt{M}} \begin{bmatrix} 1 & \omega^{-h} & \omega^{-2h} & \cdots & \omega^{-(M-1)h} \\ \vdots & \vdots & \vdots & \vdots & \vdots \\ 1 & \omega^{-1} & \omega^{-2} & \cdots & \omega^{-(M-1)} \\ 1 & 1 & 1 & \cdots & 1 \\ 1 & \omega^{1} & \omega^{2} & \cdots & \omega^{M-1} \\ \vdots & \vdots & \vdots & \vdots & \vdots \\ 1 & \omega^{h} & \omega^{2h} & \cdots & \omega^{(M-1)h} \end{bmatrix}, \omega = e^{j2\pi/M} \quad \text{(formula 8)}$$

$$J = \text{diag}\left\{\frac{1}{\sqrt{M}\, j^m J_m(kr)}\right\}, m = -h, \cdots, 0, \cdots, h$$

The receiving vector xv(k) of a virtual linear array is computed as the product of conversion matrix JF and the receiving vector x(k) of a circular array arranged uniformed interval.

$$Xv(k)=JFx(k) \quad \text{(formula 10)}$$

The arrival wave power estimation section 43 performs a computation as follows based on the information shown in the paper of R. O. Schmidt, "Multiple emitter Location and Signal parameter Estimation", IEEE Trans., AP-34,3, pp. 276–280 (1986).

First, a covariance matrix Rv of a receiving vector xv(k) from a virtual linear array is computed with formula 11. Next, an arrival wave power estimation is conducted with (formula 12) using a specified angle interval Δθ. The $\sigma^2$, here, indicates a noise power and corresponds to the minimum eigenvalue.

$$Rv = \frac{1}{N}\sum_{k=1}^{Nd} X_V(k) X_V(k)^H \quad \text{(formula 11)}$$

$$P(\theta)=(a(\theta)^H a(\theta))^{-1} a(\theta)^H (R_v - \sigma^2 I) a(\theta) a(\theta) (a(\theta)^H a(\theta))^{-1} \quad \text{(formula 12)}$$

The main wave direction estimation section 44 computes a synthesized value Ps(θ) from the computed value F(θ) at the DOA estimation section 41 as shown in formula 7 and the computed value P(θ) at the arriving wave power estimation section 43 as shown in formula 12, and estimates the direction of the maximum level by detecting the maximum value wave direction and then outputs the result of DOA estimation result 15 (formula 13). The α here indicates a constant parameter for weighting.

$$Ps(\theta)=F(\theta)+\alpha P(\theta) \quad \text{(formula 13)}$$

In the case when the power estimation is performed with a circular arrangement, the estimation tends to be influenced, in general, with grating due to the symmetric arrangement when space spectrum is estimated. The estimation accuracy can be improved by eliminating the above influence by using the power estimation using the virtual linear array in accordance with the present composition.

With a conventional DOA estimation by eigenvalue decomposition such as the MUSIC method, the separation of the number of arrival wave can not be estimated accurately because the correlation of arrival waves is high under the multiple wave transmission environment where multiple waves are composed from the reflection of the earth or buildings and when the reciprocal delay time is within a symbol time or so. With the present exemplary embodiment using a complex digital signal, it becomes possible to decrease the estimation error by synthesizing the both estimation results of the power estimation and of the DOA estimation, even when the estimation of the arrival wave number is wrong.

With the above description, even though an example that performs direction estimation at the DOA estimation signal processing section 38 with the MUSIC method is described, the same can be performed against a direction estimation algorithm based on the other eigenvalue decomposition of covariance matrix.

Also, by thinning out the complex digital signals or by conducting the operation at the DOA estimation signal processing section 38 after passing the low pass filter as described in the exemplary embodiment 1, the same effect can be obtained.

Figure 8:
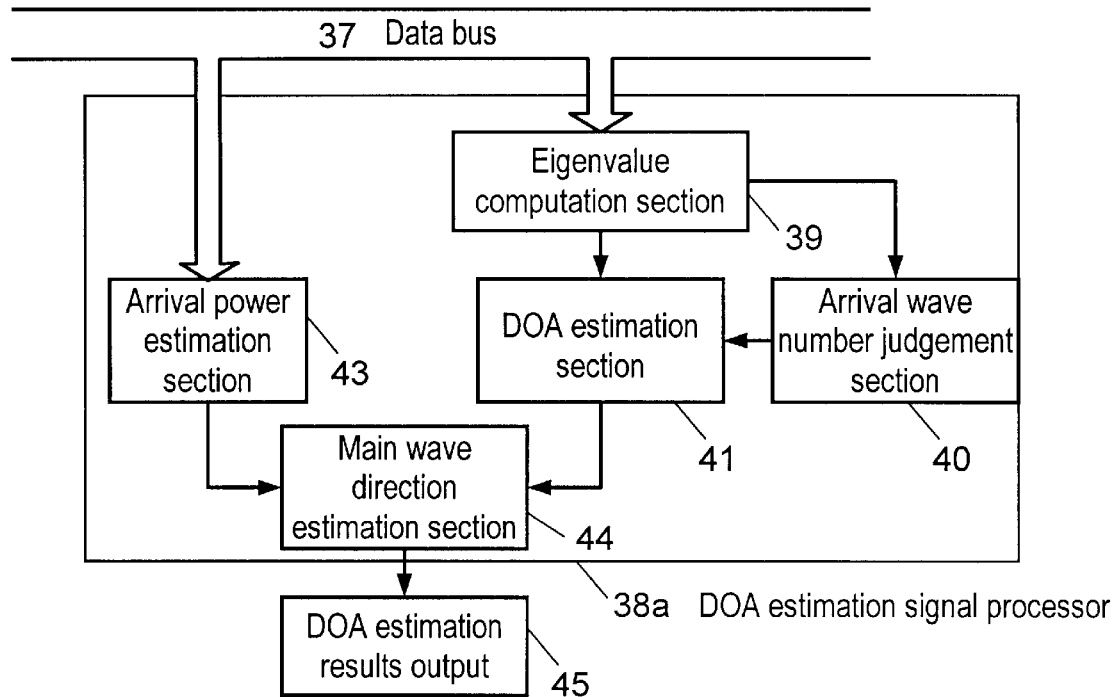
FIG. 8 is a block diagram showing another composition of the direction estimation signal process section in accordance with the fourth exemplary embodiment
Figure 9:
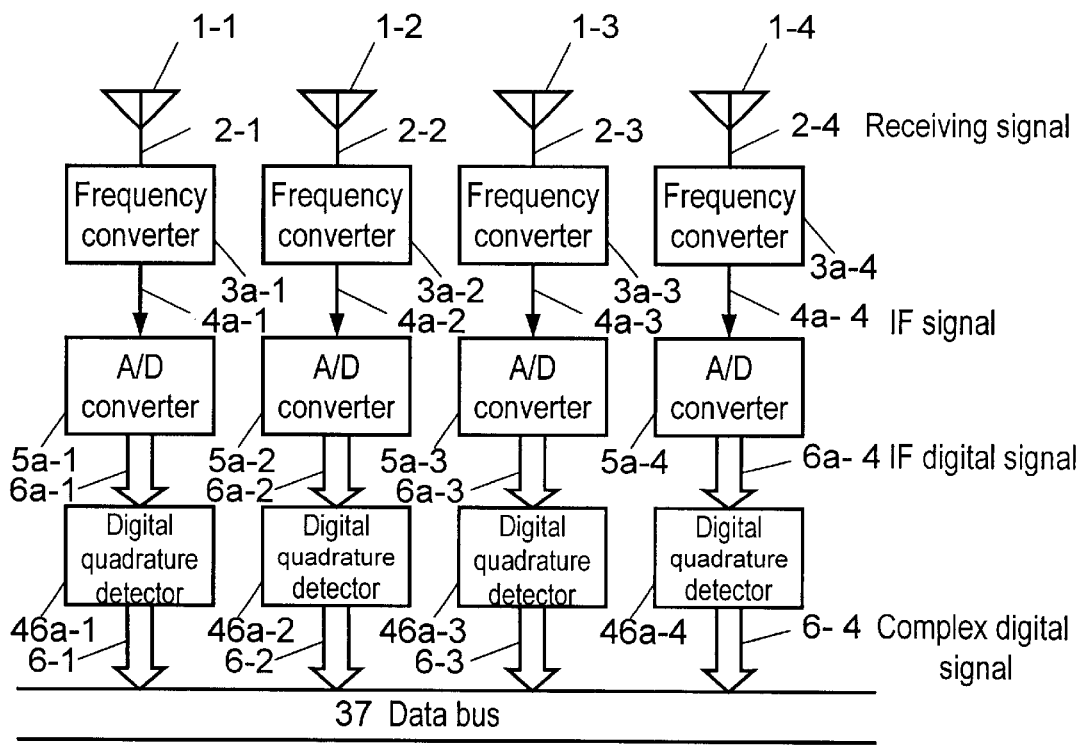
FIG. 9 is a block diagram showing still another composition of the DOA estimation apparatus in accordance with the fourth exemplary embodiment.

In the case when the array is arranged linearly with uniformed interval, the same effect can be obtained with the composition of the DOA estimation signal processor 38a as shown in FIG. 8. The difference from the FIG. 7 is that the virtual linear array converter 12 is not required since the array is arranged linearly, the arrival wave power estimation section 43 performs the power estimation directly against the complex signals 6-1, . . . ,6-M obtained through data bus 37. The other operation is the same with the case in FIG. 7.

With the composition example in FIG. 7, the A/D conversion is processed for the complex base band signals 4-1, . . . ,4-M, the A/D conversion can be processed for the IF signals 4a-1, . . . ,4a-M which is converted from the receiving signals 2-1, . . . ,2-M received at antenna elements 1-1 . . . 1-M to the intermediate frequency (IF) at the frequency converters 3-1 . . . 3-M. The same effect can be obtained with the composition that the complex digital signals 6-1, . . . ,6-M are formed with the process that the obtained IF digital signals 6a-1, . . . ,6a-M are processed through digital quadrature demodulation at digital quadrature detection section. The A/D converters 5a-1, . . . ,5a-M also, performs the nyquist sampling or bandpass sampling against the received IF signals 4a-1 . . . 4a-M. With this composition, the stages after IF stage can be digitalized and becomes preferable for the integration.

The Fifth Exemplary Embodiment

Figure 10:
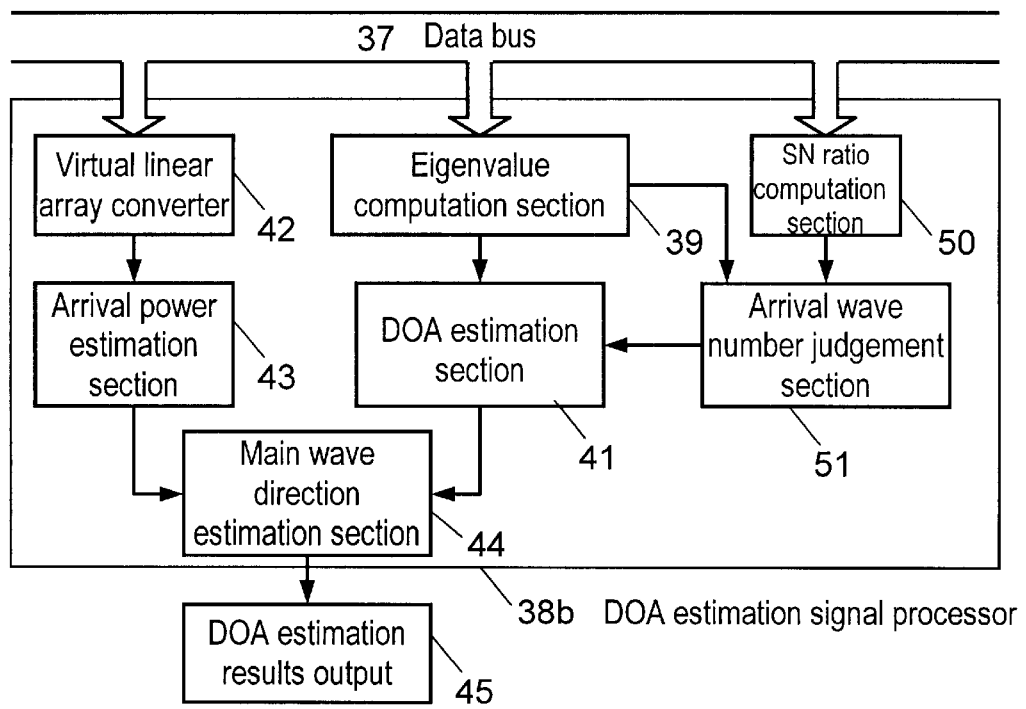
FIG. 10 is a block diagram of a direction estimation signal processing section in accordance with a fifth exemplary embodiment.

FIG. 10 is block diagram of another DOA estimation signal processor 38b. The difference with the fourth exemplary embodiment will be described mainly next. With reference to FIG. 10, the difference with the DOA estimation processor FIG. 7 are the SN ratio computation section 50 that computes SN ratio of the complex digital signals 6-1, . . . ,6-M and it changes the specified value for the arrival wave number judgement section 51 by the computed SN ratio. The operation will be described next.

The SN computation section 40 computes a SN ratio with formula 14 using receiving signal vector (k) shown in formula 5 from the complex digital signals 6-1, . . . ,6-M obtained through data bus. $N_0$ indicates a noise power level computed with formula 15 using receiving vector x0 (k) obtained from the receiving signals 2-1, . . . ,2-M when no transmitting signal is received.

$$SN=x(k)^H x(k)/N_0+1 \quad \text{(formula 14)}$$

$$N0=x_0(k)^H x_0(k) \quad \text{(formula 15)}$$

The arrival wave number judgement section 51 computes a ratio Er=(the maximum eigenvalue/the next largest eigenvalue) that is the ratio between the maximum eigenvalue and the next largest eigenvalue of the covariance matrix R and compares with the specified value Dr. As the SN ratio gets smaller, the ratio Er tends to become smaller even under the same condition of arrival wave and the separation of the arrival wave becomes difficult. Because of this, the arrival wave number judgement section 51 makes Dr as a function of SN ratio and a variable threshold value which decreases Dr in accordance with the decrease of SN ratio, for instance, Dr(SN ratio)=βSN ratio. The number of arrival wave in the case of Er≧Dr (SN ratio) is judged as 1 and in the case of Er<Dr (SN ratio), it is judged as M−1.

With the composition of the present exemplary embodiment, the judgement of arrival wave number at the arrival wave number judgement section 51 can be conducted in stable condition without being influenced by the receiving level of the arrival wave.

The Sixth Exemplary Embodiment

Figure 11:
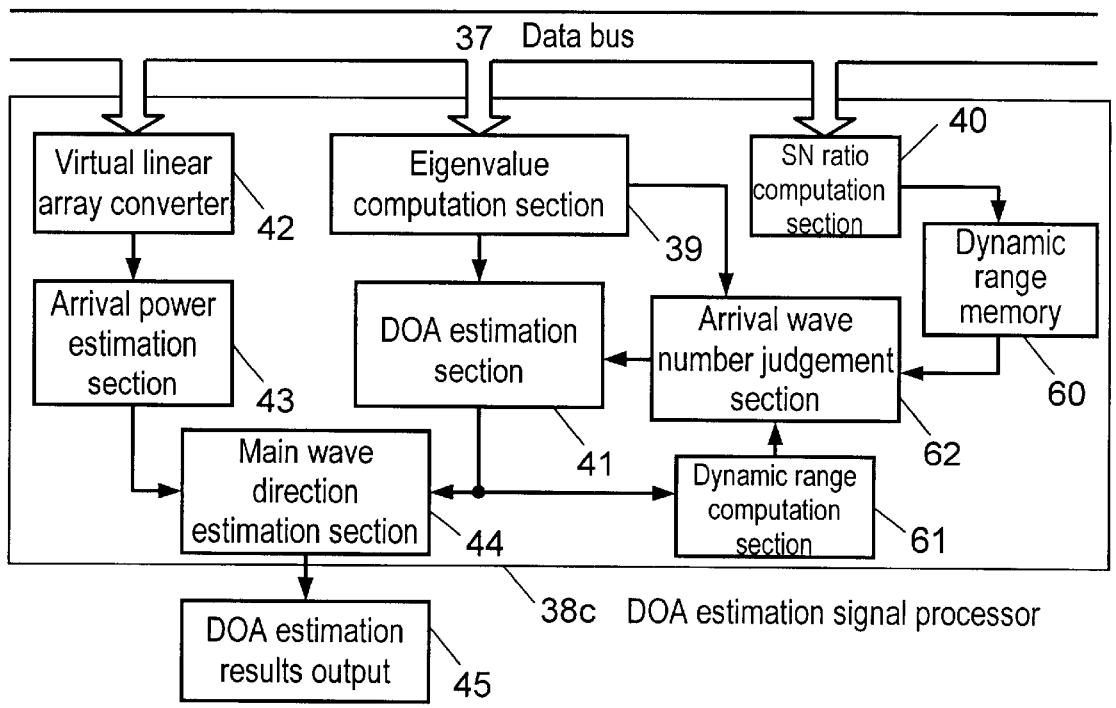
FIG. 11 is a block diagram of a direction estimation signal processing section in accordance with a sixth exemplary embodiment.

FIG. 11 is a block diagram showing yet another composition of a DOA estimation signal processor 38a. The difference with the fourth exemplary embodiment will be described mainly next.

With reference to FIG. 11, the DOA estimation signal processor 38c is equipped with a SN ratio computation section 50 that computes SN ratio of the complex digital signals 6-1, . . . ,6-M, a dynamic range memory 60 that outputs a corresponding memorized dynamic range value of the DOA estimation based on the computed SN ratio, a dynamic range computation section 61 that computes the dynamic range of the DOA estimation section 41, and the arrival wave number judgement section 62 that judges the number of arriving wave based on the output from the dynamic range memory 60 and the dynamic range computation section 61. The operation will be described next.

The SN computing section 50 computes a SN ratio with formula 14 using receiving signal vector (k) shown in formula 5 from the complex digital signals 6-1, . . . ,6-M obtained through data bus. $N_0$ indicates a noise power level computed with formula 15 using receiving vector $x_0$ (k) obtained from the receiving signals 2-1 . . . 2-M when no transmitting signal is received.

The dynamic range computation section 61 computes the maximum value and the minimum value of the result of the DOA estimation at the DOA estimation section 41 and computes the dynamic range DS=The maximum value−The minimum value. As a transmitting power parameter, the dynamic range memory 60 memorizes the DM that is the dynamic range value computed from the SN ratio at the SN ratio computing section 50 and the DOA estimation result at the DOA estimation section 41. The DM is obtained, in advance, from the result of a preliminary transmitting experiment for DOA estimation that is conducted in a wave dark room by generating plurality of waves (less than M−1) which has no reciprocal correlation with each other.

Figure 12:
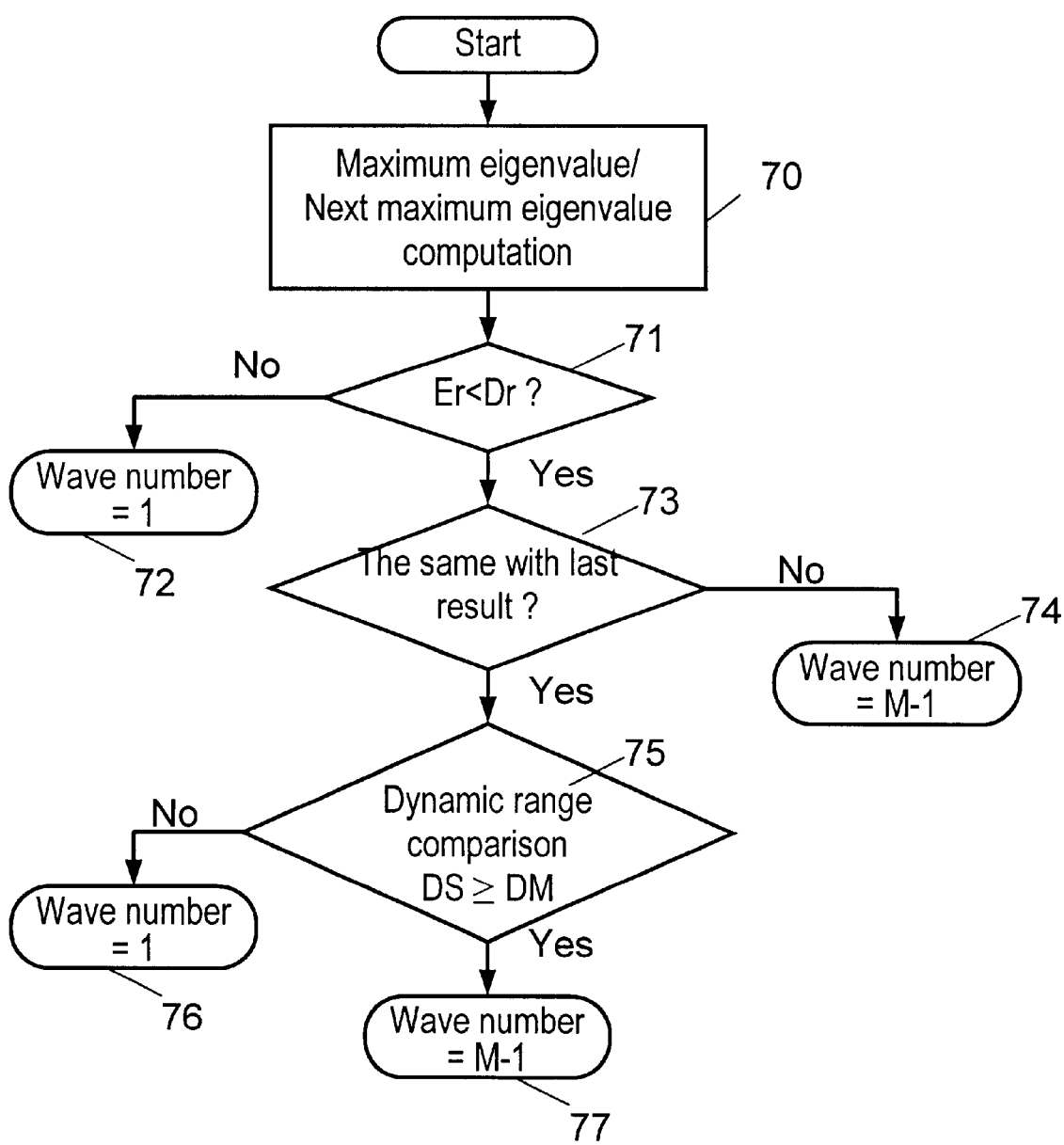
FIG. 12 is a flow chart of an arrival wave number judgement section in accordance with the sixth exemplary embodiment.

The arrival wave number judgement section 62 judges the number of arrival wave based on the output from the dynamic range memory 60 and the dynamic range computation section 61. FIG. 12 is the flow chart of the arrival wave number judgement section 62.

The operation will now be described using FIG. 12. First, the arrival wave number judgement section 62 computes a ratio Er=(the maximum eigenvalue/the next largest eigenvalue) that is the ratio between the maximum eigenvalue and the next largest eigenvalue of the covariance matrix R (Step 70). Second, the arrival wave number judgement section 62 compares Er with the specified value Dr (Step 71). Third, the arrival wave number judgement section 62 judges the number of arriving wave is as 1 if Er≧Dr (Step 72). Fourth, it judges, if Er<Dr, the judgement is the same with the last result (Step 73), and if an initial operation or the last judgement result differs, it judges the number of arriving wave is M−1 (Step 74).

When the comparison result is the same with the last judgement, the arriving wave number judgement section 62 compares the computed dynamic range value DS and the memorized value DM (Step 75), if DS<DM, it judges the number of wave as 1 judging correlation wave is included (Step 76). If DS≧DM, the arriving wave number judgement section 62 judges the number of arrival wave as M−1 judging that there is no correlation among the arrival waves (Step 77).

With above operations of the present exemplary embodiment, the judgement value at the arriving wave number judgement section 62 can be varied based on the correlation among the arrival waves utilizing the estimation result at the DOA estimation section 41 of which dynamic range becomes small when the correlation among the arrival wave is high even with the same SN ratio. As the result, the DOA estimation can be conducted in stable condition even under the various transmission conditions.

The Seventh Exemplary Embodiment

Figure 13:
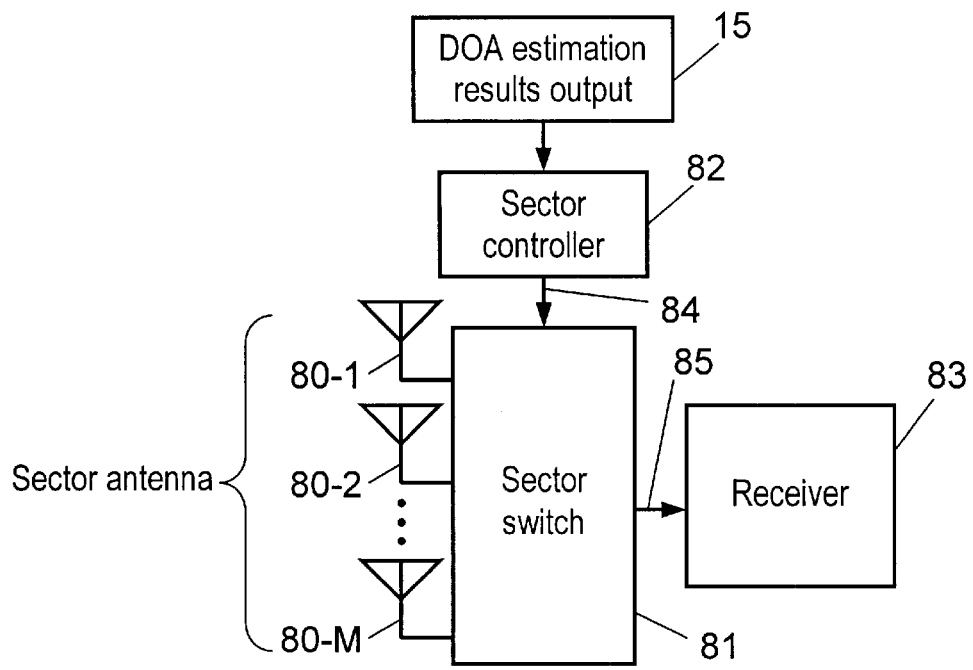
FIG. 13 is a block diagram of a variable directional signal receiving apparatus in accordance with a seventh exemplary embodiment.

FIG. 13 is a block diagram of a variable directional signal receiving apparatus. The variable directional signal receiving apparatus of the present exemplary embodiment is characterized by the usage of the DOA estimation process section 38 . . . 38c that estimates the direction of the maximum level as explained in the fourth through sixth exemplary embodiment. Namely, the variable directional signal receiving apparatus makes the directivity of the receiver variable by selecting the plurality of sector antennas that have different main beam directions. The selection is based on the DOA estimation results 15 from the DOA estimation processing section. The further explanation of the operation of the DOA estimation processing section is omitted here, since it is the same with that explained in the fourth through sixth exemplary embodiment. With reference to FIG. 13, the additional section will be described next.

The variable directional signal receiving apparatus of the present exemplary embodiment comprises m (m≧2) pieces of sector antennas 80-1, . . . ,80-M having different main beam direction, a sector switch 81, a sector controller 82 and a receiver 83.

The operation at FIG. 13 will be described next. The operation to estimate the DOA using the receiving signal obtained from the array antenna is the same with that is explained in the fourth through sixth exemplary embodiment. The final result of the maximum level direction estimation 15 obtained at DOA estimation signal processor is input to the sector controller 82. The sector controller 82 selects the number $m_s$ sector antenna of which main bean direction is the closest direction of the maximum level among the plurality of sector antennas 80-1, . . . ,80-m based on the estimation result and controls the sector switch 81 to be connected to the receiver 83. The sector switch 81 connects the number $m_s$ sector antenna to the receiver 83 based on the sector control signal 84. The receiver 83 conducts demodulation of the receiving signal 85 from the connected number $m_s$ sector antenna.

By having the aforementioned operations, the most appropriate sector antenna of which main bean direction is the closest direction of the maximum level can be selected among the plurality of sector antennas and the receiving signal 85 with high S/N ratio can be obtained. Also, the multiple beams other than the main beam direction of the selected sector antenna are suppressed and the interference between the signals can be decreased.

With the present exemplary embodiment, the sector antenna of which main bean direction is the closest direction with the maximum level direction estimation result at the DOA signal processor is selected. But the same effect can be achieved with the composition that the main beam direction is to be matched with the maximum level direction estimation result at the DOA estimation signal processor by performing the phase control of the plurality of antenna elements.

With the present exemplary embodiment, the composition of receiving apparatus is shown. It can also be applied for a transmitting apparatus by replacing the receiver 83 to transmitter and by connecting the output of the transmitter to the sector switch 81. According to this composition, the high quality transmission can be achieved with the transmission by selecting the most appropriate sector antenna of which main bean direction is the closest direction of the maximum level of the arrival wave without transmitting the power to the unnecessary directions.

The Eighth Exemplary Embodiment

Figure 14:
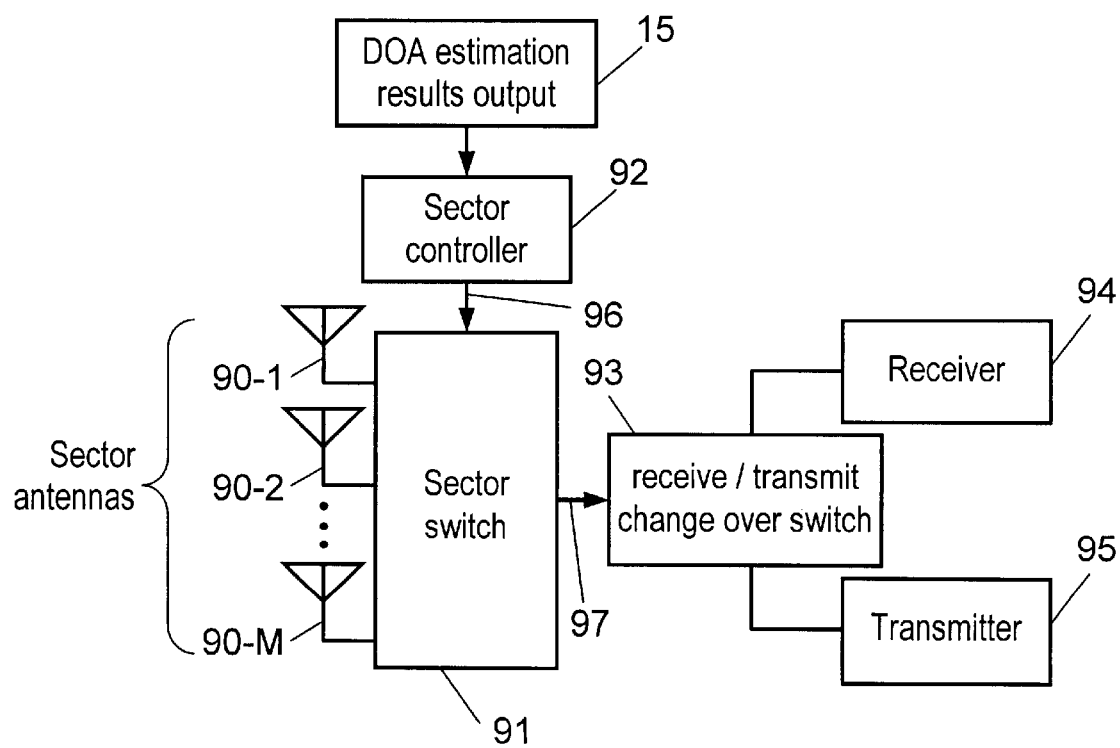
FIG. 14 is a block diagram of a variable directional signal receiving and transmitting apparatus in accordance with an exemplary embodiment 8.

FIG. 14 is a block diagram of a variable directional signal receiving and transmitting apparatus. The variable directional signal receiving apparatus of the present exemplary embodiment is, as explained in the fourth through sixth exemplary embodiment, using the DOA estimation processing section that estimates the direction of the maximum level. It selects the plurality of sector antenna that have different main beam direction based on the output of the DOA estimation results 15, making the directivity variable. The further explanation of the operation of the DOA estimation process section is omitted here since it is aforementioned. With reference to FIG. 14, the additional section will be described next.

The variable directional signal receiving and transmitting apparatus in FIG. 14 comprises m (m≧2) pieces of sector antennas 90-1, . . . ,90-M having different main beam direction, a sector switch 91, a sector controller 92, a receive/transmit changeover switch 93, receiver 94, and a transmitter 95.

The operation at FIG. 14 will be described next. The operation to estimate the DOA using the receiving signal obtained from the array antennas is the same with that is explained in the fourth through sixth exemplary embodiment. The final result of the maximum level direction estimation 15 obtained at the DOA estimation signal processor is input to the sector controller 92.

The sector controller 92 selects the number $m_s$ sector antenna of which main bean direction is the closest direction of the maximum level among the plurality of sector antennas 90-1 . . . 90-M based on the estimation result and controls the sector switch 91 to be connected to the receive/transmit changeover switch 93. The sector switch 91 connects the number $m_s$ sector antenna to the receive/transmit changeover switch 93 based on the sector control signal 96. The receiver 94 conducts demodulation of the receiving signal 97 from the connected number $m_s$ sector antenna. The transmitter 95 transmits the transmitting signal through the number $m_s$ sector antenna By the above operations, the receiving and transmitting can be performed by the most appropriate sector antenna of which main bean direction is the closest direction of the maximum level selected among the plurality of sector antenna, and also the multiple beams other than the main beam direction of the selected sector antenna is suppressed and the interference between the signals can be decreased.

With the present exemplary embodiment, the sector antenna of which main bean direction is the closest direction with the maximum level direction estimation result at the DOA estimation signal processor is selected. But the same effect can be achieved with the composition that the main beam direction is to be matched with the maximum level direction estimation result at the DOA estimation signal processor by performing the phase control of the plurality of antenna elements.

According to the above fourth through eighth exemplary embodiment, since the power estimation of the arriving wave is performed by using the virtual linear array anntenna, the estimation accuracy can be improved by eliminating the influence of grating which occurs when the power is estimated with the circular array antenna.

With the present invention furthermore, it becomes possible to decrease the estimation error by synthesizing the both estimation results of the power estimation and of the arriving direction estimation, even when the estimation of the arriving wave number is wrong.

With the conventional DOA estimation by eigenvalue decomposition such as the MUSIC method, the separation of the number of arriving wave can not be estimated accurately because the correlation of arriving waves is high under the multiple wave transmission environment where multiple waves are composed from the reflection of the earth or buildings and when the reciprocal delay time is within a symbol time or so.

What is claimed is:

1. A direction of arrival (hereinafter recited as DOA) estimation apparatus comprising:
   an array antenna using a plurality of antenna elements;
   a plurality of frequency converters that frequency convert and phase detect respective high frequency signals obtained from respective antenna elements of said array antenna and output a complex base band signals;
   a plurality of A/D converters that converts a plurality of complex base band signals output from said plurality of frequency converters to respective complex digital signals;
   a plurality of low pass filters that output respective complex low frequency signals with attenuated high frequency components of complex digital signals converted by said plurality of A/D converters;
   a plurality of down samplers that output complex signals respectively, said complex signals are down sampled by down sampling and multiplied by integral number of sampling interval of said A/D converter, said complex low pass signal generated from said plurality of low pass filters;
   a data transfer section that accumulates said plurality of complex down sampled signals obtained from respective said antenna elements and transfers the data; and
   a DOA estimation processing section that estimates an arrival direction of wave based on data output from of said data transfer section.

2. The DOA estimation apparatus according to claim 1, wherein a band width of said low pass filter ranges within the 10–50% of 3 dB band width of an arriving wave of estimating DOA.

3. The DOA estimation apparatus according to claim 1 or 2, wherein said direction estimation processing section comprises:
   a covariance matrix computation means to compute a covariance matrix using a plurality of complex down sampled signals obtained from respective antenna elements of said array antenna;
   an eigenvalue computation means to compute an eigenvalue from said covariance matrix;
   an eigenvector computation means to compute a eigenvector corresponding to said eigenvalue; and
   a DOA estimation function computation means using an eigenvector obtained by said eigenvector computation means.

4. The DOA estimation apparatus according to claim 3, wherein said DOA estimation function computation means is a maximum level direction estimation function computation means that estimates a direction of the maximum level of an arrival wave by evaluating orthogonal characteristics of a plurality of eigenvectors except for an eigenvector corresponding to a maximum eigenvalue.

5. A variable directional receiving apparatus comprising:
   (1) a direction of arrival (DOA) estimation apparatus comprising:
      an array antenna using a plurality of antenna elements;
      a plurality of frequency converters that frequency convert and phase detect respective high frequency signals obtained from respective antenna elements of said array antenna and output a complex base band signals;
      a plurality of A/D converters that converts a plurality of complex base band signals output from said plurality of frequency converters to respective complex digital signals;
      a plurality of low pass filters that output respective complex low frequency signals with attenuated high frequency components of complex digital signals converted by said plurality of A/D converters;
      a plurality of down samplers that output complex signals respectively, said complex signals are down sampled by down sampling and multiplied by integral number of sampling interval of said A/D converter, said complex low pass signal generated from said plurality of low pass filters;
      a data transfer section that accumulates said plurality of complex down sampled signals obtained from respective said antenna elements and transfers the data; and
      a DOA estimation processing section that estimates an arrival direction of wave based on data output from of said data transfer section,
      wherein said DOA estimation processing section comprises:

a covariance matrix computation means to compute a covariance matrix using a plurality of complex down sampled signals obtained from respective antenna elements of said array antenna;

an eigenvalue computation means to compute an eigenvalue from said covariance matrix;

an eigenvector computation means to compute a eigenvector corresponding to said eigenvalue; and a DOA estimation function computation means using an eigenvector obtained by said eigenvector computation means, (2) a plurality of sector antennas designed to have different main beam direction;

(3) a sector control section to output a sector control signal to select one sector antenna from said plurality of sector antennas based on the computation result by a maximum level DOA evaluation function computation means of said DOA estimation apparatus;

(4) a sector switch that connects said sector antenna selectively based on a sector control signal output from said sector control section; and a receiver.

6. A variable directional receiving apparatus comprising:

(1) a direction of arrival (DOA) estimation apparatus comprising:

an array antenna using a plurality of antenna elements;

a plurality of frequency converters that frequency convert and phase detect respective high frequency signals obtained from respective antenna elements of said array antenna and output a complex base band signals;

a plurality of A/D converters that converts a plurality of complex base band signals output from said plurality of frequency converters to respective complex digital signals;

a plurality of low pass filters that output respective complex low frequency signals with attenuated high frequency components of complex digital signals converted by said plurality of A/D converters;

a plurality of down samplers that output complex signals respectively, said complex signals are down sampled by down sampling and multiplied by integral number of sampling interval of said A/D converter, said complex low pass signal generated from said plurality of low pass filters;

a data transfer section that accumulates said plurality of complex down sampled signals obtained from respective said antenna elements and transfers the data; and a DOA estimation processing section that estimates an arrival direction of wave based on data output from of said data transfer section;

wherein said DOA estimation processing section comprises:

a covariance matrix computation means to compute a covariance matrix using a plurality of complex down sampled signals obtained from respective antenna elements of said array antenna;

an eigenvalue computation means to compute an eigenvalue from said covariance matrix;

an eigenvector computation means to compute a eigenvector corresponding to said eigenvalue; and a DOA estimation function computation means using an eigenvector obtained by said eigenvector computation means;

(2) a plurality of sector antennas designed to have different main beam direction;

(3) a phase controller that performs a phase control of an output of said plurality of antenna elements based on the computation result by the maximum level DOA evaluation function computation means of said DOA estimation apparatus; and (4) a receiver to take corresponding demodulation operation against the output signal from said phase control section.

7. A direction of arrival (DOA) estimation apparatus comprising:

an array antenna comprising a plurality of antenna elements placed with uniformed intervals as a circular shape array;

a plurality of frequency converters that frequency convert and phase detect respective high frequency signals obtained from respective antenna elements of said array antenna and output a complex base band signals;

a plurality of A/D converters that converts a plurality of complex base band signals output from said plurality of frequency converters to respective complex digital signals;

a virtual linear array converter that converts said complex digital signals output from said A/D converters at specified interval time to a virtual linear array receiving signals;

an arrival wave power estimation section that estimates a power of the arriving wave from the output of said virtual linear array converter;

an eigenvalue computation section that performs a correlation matrix computation against said complex digital signals sampled at said specified interval time and computes an eigenvalue and an eigenvector;

an arrival wave judgement section that judges a number of arrival wave from the eigenvalue computed at said eigenvalue computation section;

a DOA estimation section that changes a condition of arrival wave estimation processing by a eigenvalue decomposition method based on a judging result of said arrival wave judgement section; and a main wave direction estimation section that estimates a direction of a wave with a maximum level by synthesizing the estimation results at said arrival wave power estimation section and results at said DOA estimation section.

8. A direction of arrival (DOA) estimation apparatus comprising:

an array antenna comprising a plurality of antenna elements placed with uniformed intervals as a circular shape array;

a plurality of frequency converters that frequency convert and phase detect respective high frequency signals obtained from respective antenna elements of said array antenna and output a complex base band signals;

a plurality of A/D converters that converts a plurality of complex base band signals output from said plurality of frequency converters to respective complex digital signals;

an arrival wave power estimation section that estimates an power of the arrival wave from said complex digital signals sampled at specified interval time from said A/D converter;

an eigenvalue computation section that performs a correlation matrix computation against said complex digital signals sampled at said specified interval time and computes an eigenvalue and an eigenvector;

an arrival wave judgement section that judges a number of arrival wave from the eigenvalue computed at said eigenvalue computation section;

a DOA estimation section that changes a condition of arrival wave estimation processing by a eigenvalue decomposition method based on a judging result of said arrival wave judgement section; and a main wave direction estimation section that estimates a direction of a wave with a maximum level by synthesizing the estimation results at said arrival wave power estimation section and results at said DOA estimation section.

9. The DOA estimation apparatus according to claim 7 or 8, wherein said arrival wave number judgement section judges a number of arrival wave based on a ratio between a maximum eigenvalue and a next largest eigenvalue among the computed eigenvalue at said eigenvalue computation section.

10. The DOA estimation apparatus according to claim 7 or 8, wherein said arrival wave number judgement section judges a number of arrival wave as "1" if a ratio between a maximum eigenvalue and a next largest eigenvalue is larger than predetermined value, and judges a number of arrival wave as "number of antenna elements—1" if the ratio between a maximum eigenvalue and a next largest eigenvalue is smaller than predetermined value.

11. The DOA estimation apparatus according to claim 7 or 8, wherein said DOA estimation section performs the arrival direction estimation by computing the DOA evaluation function, and said main wave direction estimation section decides the peak direction as the maximum level of arriving wave by adding the estimation results of said arrival wave power estimation section and estimation results of said arrival wave direction estimation section.

12. The DOA estimation apparatus according to claim 7 or 8, wherein said main wave direction estimation section decides the peak direction as the maximum level of arrival wave by adding with weighting the estimation results of said power estimation section and the estimation results of said arrival direction estimation section.

13. The DOA estimation apparatus according to claim 7 or 8, further comprising:

a signal to noise (SN) ratio computation section that computes SN ratio from the output of said A/D converters and if SN ratio is less than a specified value, said arrival wave number judgement section judges a number of arrival wave as 1.

14. The DOA estimation apparatus according to claim 7 or 8, further comprising:

a signal to noise (SN) ratio computation section that computes SN ratio from the output of said A/D converters; and a dynamic range memory that memorizes a dynamic range of the DOA evaluation function from said DOA estimation section in advance against a hypothetical SN ratio value, wherein said arriving wave number judgement section computes the DOA evaluate function and obtains a dynamic range by subtracting a minimum value from a maximum value, compares said dynamic range with a memorized dynamic range value stored at said dynamic range memory and judges the number of arrival wave as 1 if said dynamic range is smaller than the memorized value.

15. The DOA estimation apparatus according to claim 7 or 8, further comprising:

digital quadrature detectors that perform digital quadrature demodulation for the digital signals from said A/D converters and outputs a complex base band signals to a virtual linear array converter and to the eigenvalue computation section, wherein said frequency converters output an intermediate frequency (IF) signals by frequency conversion and phase detection with the high frequency obtained from an respective antenna elements, and said A/D converters convert said IF signals output from said frequency converters to digital signals.

16. A variable directional signal receiving apparatus comprising:

(1) a direction of arrival (DOA) estimation apparatus comprising;

an array antenna comprising a plurality of antenna elements placed with uniformed intervals as a circular shape array;

a plurality of frequency converters that frequency convert and phase detect respective high frequency signals obtained from respective antenna elements of said array antenna and output a complex base band signals;

a plurality of A/D converters that converts a plurality of complex base band signals output from said plurality of frequency converters to respective complex digital signals;

a virtual linear array converter that converts said complex digital signals output from said A/D converters at specified interval time to a virtual linear array receiving signals;

an arrival wave power estimation section that estimates a power of the arriving wave from the output of said virtual linear array converter;

an eigenvalue computation section that performs a correlation matrix computation against said complex digital signals sampled at said specified interval time and computes an eigenvalue and an eigenvector;

an arrival wave number judgement section that judges a number of arrival wave from the eigenvalue computed at said eigenvalue computation section;

a DOA estimation section that changes a condition of arrival wave estimation processing by a eigenvalue decomposition method based on a judging result of said arrival wave judgement section; and a main wave direction estimation section that estimates a direction of a wave with a maximum level by synthesizing the estimation results at said arrival wave power estimation section and results at said DOA estimation section;

(2) plurality of sector antennas designed to have different main beam direction;

(3) a sector control section that outputs a sector control signal to select one sector antenna from said plurality of sector antennas based on the estimation result of a main wave direction estimation section of said DOA estimation apparatus;

(4) a sector switch that connects said sector antenna selectively based on the sector control signal output from said sector control section; and (5) a receiver.

17. A variable directional signal receiving apparatus comprising:

(1) a direction of arrival (DOA) estimation apparatus comprising;

an array antenna comprising a plurality of antenna elements placed with uniformed intervals as a circular shape array;

a plurality of frequency converters that frequency convert and phase detect respective high frequency signals obtained from respective antenna elements of said array antenna and output a complex base band signals;

a plurality of A/D converters that converts a plurality of complex base band signals output from said plurality of frequency converters to respective complex digital signals;

an arrival wave power estimation section that estimates an power of the arrival wave from said complex digital signals sampled at specified interval time from said A/D converter;

an eigenvalue computation section that performs a correlation matrix computation against said complex digital signals sampled at said specified interval time and computes an eigenvalue and an eigenvector;

an arrival wave number judgement section that judges a number of arrival wave from the eigenvalue computed at said eigenvalue computation section;

a DOA estimation section that changes a condition of arrival wave estimation processing by a eigenvalue decomposition method based on a judging result of said arrival wave judgement section; and a main wave direction estimation section that estimates a direction of a wave with a maximum level by synthesizing the estimation results at said arrival wave power estimation section and results at said DOA estimation section;

(2) plurality of sector antennas designed to have different main beam direction;

(3) a sector control section that outputs a sector control signal to select one sector antenna from said plurality of sector antennas based on the estimation result of a main wave direction estimation section of said DOA estimation apparatus;

(4) a sector switch that connects said sector antenna selectively based on the sector control signal output from said sector control section; and (5) a receiver.

18. A variable directional signal transmitting apparatus comprising:

(1) a direction of arrival (DOA) estimation apparatus comprising;

an array antenna comprising a plurality of antenna elements placed with uniformed intervals as a circular shape array;

a plurality of frequency converters that frequency convert and phase detect respective high frequency signals obtained from respective antenna elements of said array antenna and output a complex base band signals;

a plurality of A/D converters that converts a plurality of complex base band signals output from said plurality of frequency converters to respective complex digital signals;

a virtual linear array converter that converts said complex digital signals output from said A/D converters at specified interval time to a virtual linear array receiving signals;

an arrival wave power estimation section that estimates a power of the arriving wave from the output of said virtual linear array converter;

an eigenvalue computation section that performs a correlation matrix computation against said complex digital signals sampled at said specified interval time and computes an eigenvalue and an eigenvector;

an arrival wave number judgement section that judges a number of arrival wave from the eigenvalue computed at said eigenvalue computation section;

a DOA estimation section that changes a condition of arrival wave estimation processing by a eigenvalue decomposition method based on a judging result of said arrival wave judgement section; and a main wave direction estimation section that estimates a direction of a wave with a maximum level by synthesizing the estimation results at said arrival wave power estimation section and results at said DOA estimation section;

(2) plurality of sector antennas designed to have different main beam direction;

(3) a sector control section that outputs a sector control signal to select one sector antenna from said plurality of sector antennas based on the estimation result of a main wave direction estimation section of said DOA estimation apparatus;

(4) a sector switch that connects said sector antenna selectively based on the sector control signal output from said sector control section; and (5) a transmitter.

19. A variable directional signal transmitting apparatus comprising:

(1) a direction of arrival (DOA) estimation apparatus comprising;

an array antenna comprising a plurality of antenna elements placed with uniformed intervals as a circular shape array;

a plurality of frequency converters that frequency convert and phase detect respective high frequency signals obtained from respective antenna elements of said array antenna and output a complex base band signals;

a plurality of A/D converters that converts a plurality of complex base band signals output from said plurality of frequency converters to respective complex digital signals;

an arrival wave power estimation section that estimates an power of the arrival wave from said complex digital signals sampled at specified interval time from said A/D converter;

an eigenvalue computation section that performs a correlation matrix computation against said complex digital signals sampled at said specified interval time and computes an eigenvalue and an eigenvector;

an arrival wave number judgement section that judges a number of arrival wave from the eigenvalue computed at said eigenvalue computation section;

a DOA estimation section that changes a condition of arrival wave estimation processing by a eigenvalue decomposition method based on a judging result of said arrival wave judgement section; and a main wave direction estimation section that estimates a direction of a wave with a maximum level by synthesizing the estimation results at said arrival wave power estimation section and results at said DOA estimation section;

(2) plurality of sector antennas designed to have different main beam direction;

(3) a sector control section that outputs a sector control signal to select one sector antenna from said plurality of sector antennas based on the estimation result by the main wave direction estimation section of said DOA estimation apparatus;

(4) a sector switch that connects said sector antenna selectively based on the sector control signal output from said sector control section; and (5) a transmitter.

20. A variable directional signal receiving and transmitting apparatus comprising:

(1) a direction of arrival (DOA) estimation apparatus comprising:
- an array antenna comprising a plurality of antenna elements placed with uniformed intervals as a circular shape array;
- a plurality of frequency converters that frequency convert and phase detect respective high frequency signals obtained from respective antenna elements of said array antenna and output a complex base band signals;
- a plurality of A/D converters that converts a plurality of complex base band signals output from said plurality of frequency converters to respective complex digital signals;
- a virtual linear array converter that converts said complex digital signals output from said A/D converters at specified interval time to a virtual linear array receiving signals;
- an arrival wave power estimation section that estimates a power of the arriving wave from the output of said virtual linear array converter;
- an eigenvalue computation section that performs a correlation matrix computation against said complex digital signals sampled at said specified interval time and computes an eigenvalue and an eigenvector;
- an arrival wave judgement section that judges a number of arrival wave from the eigenvalue computed at said eigenvalue computation section;
- a DOA estimation section that changes a condition of arrival wave estimation processing by a eigenvalue decomposition method based on a judging result of said arrival wave judgement section; and
- a main wave direction estimation section that estimates a direction of a wave with a maximum level by synthesizing the estimation results at said arrival wave power estimation section and results at said DOA estimation section;

(2) plurality of sector antenna designed to have different main beam direction;

(3) a sector controller that outputs a sector control signal to select one sector antenna from said plurality of sector antennas based on the estimation results by the main wave direction estimation section of said DOA estimation apparatus;

(4) a sector switch that connects said sector antenna selectively based on the sector control signal generated from said sector controller; and (5) a receiver;

(6) a transmitter; and (7) a receive/transmit changeover switch connected to said sector switch.

21. A variable directional signal receiving and transmitting apparatus comprising:

(1) a direction of arrival (DOA) estimation apparatus comprising:
- an array antenna comprising a plurality of antenna elements placed with uniformed intervals as a circular shape array;
- a plurality of frequency converters that frequency convert and phase detect respective high frequency signals obtained from respective antenna elements of said array antenna and output a complex base band signals;
- a plurality of A/D converters that converts a plurality of complex base band signals output from said plurality of frequency converters to respective complex digital signals;
- an arrival wave power estimation section that estimates an power of the arrival wave from said complex digital signals sampled at specified interval time from said A/D converter;
- an eigenvalue computation section that performs a correlation matrix computation against said complex digital signals sampled at said specified interval time and computes an eigenvalue and an eigenvector;
- an arrival wave number judgement section that judges a number of arrival wave from the eigenvalue computed at said eigenvalue computation section;
- a DOA estimation section that changes a condition of arrival wave estimation processing by a eigenvalue decomposition method based on a judging result of said arrival wave judgement section; and
- a main wave direction estimation section that estimates a direction of a wave with a maximum level by synthesizing the estimation results at said arrival wave power estimation section and results at said DOA estimation section;

(2) plurality of sector antenna designed to have different main beam direction;

(3) a sector controller that outputs a sector control signal to select one sector antenna from said plurality of sector antennas based on the estimation results by the main wave direction estimation section of said DOA estimation apparatus;

(4) a sector switch that connects said sector antenna selectively based on the sector control signal generated from said sector controller; and (5) a receiver;

(6) a transmitter; and (7) a receive/transmit changeover switch connected to said sector switch.

* * * * *

UNITED STATES PATENT AND TRADEMARK OFFICE
CERTIFICATE OF CORRECTION

PATENT NO.    : 6,351,238 B1
DATED         : February 26, 2002
INVENTOR(S)   : Takaaki Kishigami, Takashi Fukagawa and Makoto Hasegawa It is certified that error appears in the above-identified patent and that said Letters Patent is hereby corrected as shown below:

<u>Title page,</u>
Item [30], Foreign Application Priority Data, delete "2000-014515" and replace with -- 12-014515 --.

Signed and Sealed this

Fourth Day of March, 2003

JAMES E. ROGAN
*Director of the United States Patent and Trademark Office*